(12) United States Patent
Chen et al.

(10) Patent No.: US 9,485,546 B2
(45) Date of Patent: Nov. 1, 2016

(54) SIGNALING VIDEO SAMPLES FOR TRICK MODE VIDEO REPRESENTATIONS

(75) Inventors: Ying Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 12/908,593

(22) Filed: Oct. 20, 2010

(65) Prior Publication Data

US 2011/0317760 A1    Dec. 29, 2011

Related U.S. Application Data

(60) Provisional application No. 61/359,748, filed on Jun. 29, 2010, provisional application No. 61/366,343, filed on Jul. 21, 2010, provisional application No. 61/363,884, filed on Jul. 13, 2010.

(51) Int. Cl.
| | |
|---|---|
| *H04N 7/32* | (2006.01) |
| *H04N 7/173* | (2011.01) |
| *H04N 21/845* | (2011.01) |
| *G11B 27/00* | (2006.01) |
| *G11B 27/10* | (2006.01) |
| *G11B 27/30* | (2006.01) |
| *H04N 19/70* | (2014.01) |

(52) U.S. Cl.
CPC ......... *H04N 21/8455* (2013.01); *G11B 27/007* (2013.01); *G11B 27/105* (2013.01); *G11B 27/3027* (2013.01); *H04N 19/70* (2014.11)

(58) Field of Classification Search
USPC ........................................................ 375/240
See application file for complete search history.

(56) References Cited

U.S. PATENT DOCUMENTS

| | | |
|---|---|---|
| 4,901,319 A | 2/1990 | Ross |
| 5,566,208 A | 10/1996 | Balakrishnan |
| 5,802,394 A | 9/1998 | Baird et al. |

(Continued)

FOREIGN PATENT DOCUMENTS

| | | |
|---|---|---|
| CN | 1338839 A | 3/2002 |
| CN | 1481643 A | 3/2004 |

(Continued)

OTHER PUBLICATIONS

3GPP TS 26.234 V9.1.0, 3rd Generation Partnership Project; Technical Specification Group Services and System Aspects; Transparent end-to-end Packet-switched Streaming Service (PSS); Protocols and codecs (Release 9), Dec. 2009, 179 pages.

(Continued)

*Primary Examiner* — Dave Czekaj
*Assistant Examiner* — Md Haque
(74) *Attorney, Agent, or Firm* — Brent Boyd

(57) ABSTRACT

This disclosure describes techniques relevant to HTTP streaming of media data. According to these techniques, a server device may signal a byte range for at least one intra-decodable (I-frame) of a video fragment. According to the techniques of this disclosure, a client device may communicate a request to a server device to retrieve the at least one I-frame based on the signaled byte range, and use the retrieved I-frame to provide a high speed version of a video presentation that includes the at least one I-frame. A high speed version of a video presentation may be a trick mode of the video presentation, such as a fast forward or fast rewind version of the video presentation.

38 Claims, 12 Drawing Sheets

(56) References Cited

U.S. PATENT DOCUMENTS

| | | | |
|---|---|---|---|
| 5,844,636 A | 12/1998 | Joseph et al. | |
| 6,055,012 A | 4/2000 | Haskell et al. | |
| 6,061,820 A | 5/2000 | Nakakita et al. | |
| 6,079,041 A | 6/2000 | Kunisa et al. | |
| 6,141,787 A | 10/2000 | Kunisa et al. | |
| 6,166,544 A | 12/2000 | Debbins et al. | |
| 6,226,259 B1 | 5/2001 | Piret | |
| 6,226,301 B1 | 5/2001 | Cheng et al. | |
| 6,307,487 B1 | 10/2001 | Luby | |
| 6,320,520 B1 | 11/2001 | Luby | |
| 6,332,163 B1 | 12/2001 | Bowman-Amuah | |
| 6,415,326 B1 | 7/2002 | Gupta et al. | |
| 6,510,177 B1 | 1/2003 | De et al. | |
| 6,631,172 B1 | 10/2003 | Shokrollahi et al. | |
| 6,804,202 B1 | 10/2004 | Hwang | |
| 6,856,263 B2 | 2/2005 | Shokrollahi et al. | |
| 6,876,623 B1 | 4/2005 | Lou et al. | |
| 6,937,618 B1 | 8/2005 | Noda et al. | |
| 6,985,459 B2 | 1/2006 | Dickson | |
| 7,031,257 B1 | 4/2006 | Lu et al. | |
| 7,068,681 B2 | 6/2006 | Chang et al. | |
| 7,068,729 B2 | 6/2006 | Shokrollahi et al. | |
| 7,073,191 B2 | 7/2006 | Srikantan et al. | |
| 7,100,188 B2 | 8/2006 | Hejna et al. | |
| 7,113,773 B2 | 9/2006 | Quick et al. | |
| 7,139,960 B2 | 11/2006 | Shokrollahi et al. | |
| 7,143,433 B1 | 11/2006 | Duan et al. | |
| 7,151,754 B1 | 12/2006 | Boyce et al. | |
| 7,164,882 B2 | 1/2007 | Poltorak | |
| 7,240,358 B2 | 7/2007 | Horn et al. | |
| 7,257,764 B2 | 8/2007 | Suzuki et al. | |
| 7,295,573 B2 | 11/2007 | Yi et al. | |
| 7,304,990 B2 | 12/2007 | Rajwan | |
| 7,363,048 B2 | 4/2008 | Cheng et al. | |
| 7,391,717 B2 | 6/2008 | Klemets et al. | |
| 7,409,626 B1 | 8/2008 | Schelstraete | |
| 7,418,651 B2 | 8/2008 | Luby et al. | |
| 7,483,447 B2 | 1/2009 | Chang et al. | |
| 7,529,806 B1 | 5/2009 | Shteyn | |
| 7,555,006 B2 | 6/2009 | Wolfe et al. | |
| 7,644,335 B2 | 1/2010 | Luby et al. | |
| 7,668,198 B2 | 2/2010 | Yi et al. | |
| 7,676,735 B2 | 3/2010 | Luby et al. | |
| 7,720,096 B2 | 5/2010 | Klemets | |
| 7,924,913 B2 | 4/2011 | Sullivan et al. | |
| 7,961,700 B2 | 6/2011 | Malladi et al. | |
| 7,979,769 B2 | 7/2011 | Lee et al. | |
| 8,027,328 B2 | 9/2011 | Yang et al. | |
| 8,028,322 B2 | 9/2011 | Riedl et al. | |
| 8,081,716 B2 | 12/2011 | Kang et al. | |
| 8,135,073 B2 | 3/2012 | Shen | |
| 8,185,794 B2 | 5/2012 | Lohmar et al. | |
| 8,185,809 B2 | 5/2012 | Luby et al. | |
| RE43,741 E | 10/2012 | Shokrollahi et al. | |
| 8,301,725 B2 | 10/2012 | Biderman et al. | |
| 8,327,403 B1 | 12/2012 | Chilvers et al. | |
| 8,331,445 B2 | 12/2012 | Garudadri et al. | |
| 8,340,133 B2 | 12/2012 | Kim et al. | |
| 8,422,474 B2 | 4/2013 | Park et al. | |
| 8,462,643 B2 | 6/2013 | Walton et al. | |
| 8,544,043 B2 | 9/2013 | Parekh et al. | |
| 8,572,646 B2 | 10/2013 | Haberman et al. | |
| 8,615,023 B2 | 12/2013 | Oh et al. | |
| 8,638,796 B2 | 1/2014 | Dan et al. | |
| 8,713,624 B1 | 4/2014 | Harvey et al. | |
| 8,737,421 B2 | 5/2014 | Zhang et al. | |
| 8,806,050 B2 | 8/2014 | Chen et al. | |
| 8,887,020 B2 | 11/2014 | Shokrollahi | |
| 8,918,533 B2 | 12/2014 | Chen et al. | |
| 2001/0015944 A1 | 8/2001 | Takahashi et al. | |
| 2001/0033586 A1 | 10/2001 | Takashimizu et al. | |
| 2002/0009137 A1 | 1/2002 | Nelson et al. | |
| 2002/0083345 A1 | 6/2002 | Halliday et al. | |
| 2002/0085013 A1 | 7/2002 | Lippincott | |
| 2002/0133247 A1 | 9/2002 | Smith et al. | |
| 2002/0141433 A1 | 10/2002 | Kwon et al. | |
| 2002/0143953 A1 | 10/2002 | Aiken | |
| 2003/0005386 A1 | 1/2003 | Bhatt et al. | |
| 2003/0138043 A1 | 7/2003 | Hannuksela | |
| 2003/0194211 A1 | 10/2003 | Abecassis | |
| 2003/0207696 A1 | 11/2003 | Willenegger et al. | |
| 2003/0224773 A1 | 12/2003 | Deeds | |
| 2004/0008790 A1* | 1/2004 | Rodriguez | 375/240.26 |
| 2004/0015768 A1 | 1/2004 | Bordes et al. | |
| 2004/0031054 A1 | 2/2004 | Dankworth et al. | |
| 2004/0049793 A1 | 3/2004 | Chou | |
| 2004/0066854 A1 | 4/2004 | Hannuksela | |
| 2004/0081106 A1 | 4/2004 | Bruhn | |
| 2004/0096110 A1 | 5/2004 | Yogeshwar et al. | |
| 2004/0117716 A1 | 6/2004 | Shen | |
| 2004/0162071 A1 | 8/2004 | Grilli et al. | |
| 2004/0231004 A1 | 11/2004 | Seo | |
| 2004/0240382 A1 | 12/2004 | Ido et al. | |
| 2004/0255328 A1 | 12/2004 | Baldwin et al. | |
| 2005/0071491 A1 | 3/2005 | Seo | |
| 2005/0084006 A1 | 4/2005 | Lei et al. | |
| 2005/0091697 A1 | 4/2005 | Tanaka et al. | |
| 2005/0097213 A1 | 5/2005 | Barrett et al. | |
| 2005/0102371 A1 | 5/2005 | Aksu | |
| 2005/0105371 A1 | 5/2005 | Johnson et al. | |
| 2005/0123058 A1 | 6/2005 | Greenbaum et al. | |
| 2005/0160272 A1 | 7/2005 | Teppler | |
| 2005/0163468 A1 | 7/2005 | Takahashi et al. | |
| 2005/0180415 A1 | 8/2005 | Cheung et al. | |
| 2005/0193309 A1 | 9/2005 | Grilli et al. | |
| 2005/0195752 A1 | 9/2005 | Amin et al. | |
| 2005/0207392 A1 | 9/2005 | Sivalingham et al. | |
| 2005/0216472 A1 | 9/2005 | Leon et al. | |
| 2005/0216951 A1 | 9/2005 | MacInnis | |
| 2006/0015568 A1 | 1/2006 | Walsh et al. | |
| 2006/0031738 A1 | 2/2006 | Fay et al. | |
| 2006/0037057 A1* | 2/2006 | Xu | 725/90 |
| 2006/0080588 A1 | 4/2006 | Starr et al. | |
| 2006/0107174 A1 | 5/2006 | Heise | |
| 2006/0120464 A1 | 6/2006 | Hannuksela | |
| 2006/0174021 A1* | 8/2006 | Osborne et al. | 709/230 |
| 2006/0212444 A1 | 9/2006 | Handman et al. | |
| 2006/0229075 A1 | 10/2006 | Kim et al. | |
| 2006/0244824 A1 | 11/2006 | Debey | |
| 2006/0244865 A1 | 11/2006 | Simon | |
| 2006/0248195 A1 | 11/2006 | Toumura et al. | |
| 2006/0256851 A1 | 11/2006 | Wang et al. | |
| 2007/0002953 A1 | 1/2007 | Kusunoki | |
| 2007/0006274 A1 | 1/2007 | Paila et al. | |
| 2007/0016594 A1 | 1/2007 | Visharam et al. | |
| 2007/0022215 A1 | 1/2007 | Singer et al. | |
| 2007/0078876 A1 | 4/2007 | Hayashi et al. | |
| 2007/0134005 A1 | 6/2007 | Myong et al. | |
| 2007/0140369 A1 | 6/2007 | Limberg et al. | |
| 2007/0153914 A1 | 7/2007 | Hannuksela et al. | |
| 2007/0157267 A1* | 7/2007 | Lopez-Estrada | 725/90 |
| 2007/0162568 A1 | 7/2007 | Gupta et al. | |
| 2007/0162611 A1 | 7/2007 | Yu et al. | |
| 2007/0177811 A1 | 8/2007 | Yang et al. | |
| 2007/0185973 A1 | 8/2007 | Wayda et al. | |
| 2007/0195894 A1 | 8/2007 | Shokrollahi et al. | |
| 2007/0200949 A1 | 8/2007 | Walker et al. | |
| 2007/0201819 A1* | 8/2007 | Sung et al. | 386/68 |
| 2007/0204196 A1 | 8/2007 | Watson et al. | |
| 2007/0230564 A1 | 10/2007 | Chen et al. | |
| 2007/0233784 A1 | 10/2007 | ORourke et al. | |
| 2007/0255844 A1 | 11/2007 | Shen et al. | |
| 2007/0274389 A1 | 11/2007 | Kim et al. | |
| 2007/0277209 A1 | 11/2007 | Yousef | |
| 2008/0010153 A1 | 1/2008 | Pugh-O'Connor et al. | |
| 2008/0010648 A1* | 1/2008 | Ando et al. | 719/328 |
| 2008/0059325 A1 | 3/2008 | Kazmi et al. | |
| 2008/0066136 A1 | 3/2008 | Dorai et al. | |
| 2008/0075172 A1 | 3/2008 | Koto | |
| 2008/0086751 A1 | 4/2008 | Horn et al. | |
| 2008/0101478 A1 | 5/2008 | Kusunoki | |
| 2008/0109557 A1 | 5/2008 | Joshi et al. | |
| 2008/0134005 A1 | 6/2008 | Izzat et al. | |
| 2008/0137744 A1 | 6/2008 | Moriya et al. | |

(56) References Cited

U.S. PATENT DOCUMENTS

| | | |
|---|---|---|
| 2008/0168133 A1 | 7/2008 | Osborne |
| 2008/0168516 A1 | 7/2008 | Flick et al. |
| 2008/0170564 A1 | 7/2008 | Shi et al. |
| 2008/0170806 A1 | 7/2008 | Kim |
| 2008/0172430 A1 | 7/2008 | Thorstensen |
| 2008/0172712 A1 | 7/2008 | Munetsugu |
| 2008/0181296 A1 | 7/2008 | Tian et al. |
| 2008/0189419 A1 | 8/2008 | Girle et al. |
| 2008/0192818 A1 | 8/2008 | DiPietro et al. |
| 2008/0215317 A1 | 9/2008 | Fejzo |
| 2008/0243918 A1 | 10/2008 | Holtman |
| 2008/0267287 A1 | 10/2008 | Hannuksela |
| 2008/0281943 A1 | 11/2008 | Shapiro |
| 2008/0285556 A1 | 11/2008 | Park et al. |
| 2008/0313191 A1 | 12/2008 | Bouazizi |
| 2009/0003439 A1 | 1/2009 | Wang et al. |
| 2009/0019229 A1 | 1/2009 | Morrow et al. |
| 2009/0043906 A1 | 2/2009 | Hurst et al. |
| 2009/0055705 A1 | 2/2009 | Gao |
| 2009/0067551 A1 | 3/2009 | Chen et al. |
| 2009/0083806 A1 | 3/2009 | Barrett et al. |
| 2009/0089445 A1 | 4/2009 | Deshpande |
| 2009/0092138 A1 | 4/2009 | Joo et al. |
| 2009/0100496 A1 | 4/2009 | Bechtolsheim et al. |
| 2009/0103523 A1 | 4/2009 | Katis et al. |
| 2009/0106356 A1 | 4/2009 | Brase et al. |
| 2009/0150557 A1 | 6/2009 | Wormley et al. |
| 2009/0164653 A1 | 6/2009 | Mandyam et al. |
| 2009/0222873 A1 | 9/2009 | Einarsson |
| 2009/0248697 A1 | 10/2009 | Richardson et al. |
| 2009/0257508 A1 | 10/2009 | Aggarwal et al. |
| 2009/0287841 A1 | 11/2009 | Chapweske et al. |
| 2009/0297123 A1 | 12/2009 | Virdi et al. |
| 2009/0300203 A1 | 12/2009 | Virdi et al. |
| 2009/0300204 A1 | 12/2009 | Zhang et al. |
| 2009/0319563 A1 | 12/2009 | Schnell |
| 2009/0328228 A1 | 12/2009 | Schnell |
| 2010/0011061 A1 | 1/2010 | Hudson et al. |
| 2010/0011117 A1 | 1/2010 | Hristodorescu et al. |
| 2010/0023525 A1 | 1/2010 | Westerlund et al. |
| 2010/0049865 A1 | 2/2010 | Hannuksela et al. |
| 2010/0061444 A1 | 3/2010 | Wilkins et al. |
| 2010/0067495 A1 | 3/2010 | Lee et al. |
| 2010/0131671 A1 | 5/2010 | Kohli et al. |
| 2010/0153578 A1 | 6/2010 | Van et al. |
| 2010/0174823 A1 | 7/2010 | Huang |
| 2010/0189131 A1 | 7/2010 | Branam et al. |
| 2010/0198982 A1 | 8/2010 | Fernandez |
| 2010/0211690 A1 | 8/2010 | Pakzad et al. |
| 2010/0235528 A1 | 9/2010 | Bocharov et al. |
| 2010/0257051 A1 | 10/2010 | Fernandez |
| 2010/0318632 A1 | 12/2010 | Yoo et al. |
| 2011/0032333 A1 | 2/2011 | Neuman |
| 2011/0055881 A1 | 3/2011 | Yu et al. |
| 2011/0096828 A1 | 4/2011 | Chen et al. |
| 2011/0231519 A1 | 9/2011 | Luby et al. |
| 2011/0231569 A1 | 9/2011 | Luby et al. |
| 2011/0238789 A1 | 9/2011 | Luby et al. |
| 2011/0239078 A1 | 9/2011 | Luby et al. |
| 2011/0268178 A1 | 11/2011 | Park et al. |
| 2011/0280311 A1 | 11/2011 | Chen et al. |
| 2011/0307545 A1 | 12/2011 | Bouazizi |
| 2011/0317771 A1 | 12/2011 | Chen et al. |
| 2012/0013746 A1 | 1/2012 | Chen et al. |
| 2012/0020413 A1 | 1/2012 | Chen et al. |
| 2012/0023249 A1 | 1/2012 | Chen et al. |
| 2012/0023254 A1 | 1/2012 | Park et al. |
| 2012/0033730 A1 | 2/2012 | Lee |
| 2012/0042050 A1 | 2/2012 | Chen et al. |
| 2012/0042089 A1 | 2/2012 | Chen et al. |
| 2012/0047280 A1 | 2/2012 | Park et al. |
| 2012/0099593 A1 | 4/2012 | Luby |
| 2012/0105583 A1 | 5/2012 | Suh et al. |
| 2012/0151302 A1 | 6/2012 | Luby et al. |
| 2012/0185530 A1 | 7/2012 | Reza |
| 2012/0202535 A1 | 8/2012 | Chaddha et al. |
| 2012/0317305 A1 | 12/2012 | Einarsson et al. |
| 2013/0002483 A1 | 1/2013 | Rowitch et al. |
| 2013/0007223 A1 | 1/2013 | Luby et al. |
| 2013/0067295 A1 | 3/2013 | Luby et al. |
| 2013/0091251 A1 | 4/2013 | Walker et al. |
| 2013/0246643 A1 | 9/2013 | Luby et al. |
| 2013/0254634 A1 | 9/2013 | Luby et al. |
| 2013/0287023 A1 | 10/2013 | Bims |
| 2014/0009578 A1 | 1/2014 | Chen et al. |
| 2014/0380113 A1 | 12/2014 | Luby |
| 2015/0358382 A1 | 12/2015 | Chen et al. |

FOREIGN PATENT DOCUMENTS

| | | |
|---|---|---|
| CN | 1708934 A | 12/2005 |
| CN | 1714577 A | 12/2005 |
| CN | 1806392 A | 7/2006 |
| CN | 1819661 A | 8/2006 |
| CN | 1909865 A | 2/2007 |
| CN | 101390399 A | 3/2009 |
| CN | 101690118 A | 3/2010 |
| CN | 101729857 A | 6/2010 |
| EP | 0669587 A2 | 8/1995 |
| EP | 0701371 A1 | 3/1996 |
| EP | 0784401 A2 | 7/1997 |
| EP | 0853433 A1 | 7/1998 |
| EP | 0986908 A1 | 3/2000 |
| EP | 1051027 A1 | 11/2000 |
| EP | 1124344 A1 | 8/2001 |
| EP | 1298931 A2 | 4/2003 |
| EP | 1406452 A2 | 4/2004 |
| EP | 1746826 A1 | 1/2007 |
| EP | 2046044 A1 | 4/2009 |
| EP | 1700410 B1 | 4/2010 |
| EP | 2323390 A2 | 5/2011 |
| JP | H07183873 | 7/1995 |
| JP | 08186570 | 7/1996 |
| JP | 8289255 A | 11/1996 |
| JP | 9252253 A | 9/1997 |
| JP | 11041211 A | 2/1999 |
| JP | 11164270 A | 6/1999 |
| JP | 2000151426 A | 5/2000 |
| JP | 2000513164 A | 10/2000 |
| JP | 2000353969 A | 12/2000 |
| JP | 2001094625 | 4/2001 |
| JP | 2001223655 A | 8/2001 |
| JP | 2001274776 A | 10/2001 |
| JP | 2002073625 A | 3/2002 |
| JP | 2002543705 A | 12/2002 |
| JP | 2003018568 A | 1/2003 |
| JP | 2003092564 A | 3/2003 |
| JP | 2003510734 A | 3/2003 |
| JP | 2003174489 | 6/2003 |
| JP | 2003256321 A | 9/2003 |
| JP | 2003318975 A | 11/2003 |
| JP | 2003319012 | 11/2003 |
| JP | 2004070712 A | 3/2004 |
| JP | 2004135013 A | 4/2004 |
| JP | 2004192140 A | 7/2004 |
| JP | 2004193992 A | 7/2004 |
| JP | 2004529533 A | 9/2004 |
| JP | 2004343701 A | 12/2004 |
| JP | 2004348824 A | 12/2004 |
| JP | 2004362099 A | 12/2004 |
| JP | 2005094140 A | 4/2005 |
| JP | 2005136546 A | 5/2005 |
| JP | 2005277950 A | 10/2005 |
| JP | 2005533444 A | 11/2005 |
| JP | 2006503463 A | 1/2006 |
| JP | 2006506926 A | 2/2006 |
| JP | 2006074335 A | 3/2006 |
| JP | 2006115104 A | 4/2006 |
| JP | 2006174045 A | 6/2006 |
| JP | 2006186419 A | 7/2006 |
| JP | 2006519517 A | 8/2006 |
| JP | 2006287422 A | 10/2006 |
| JP | 2006319743 A | 11/2006 |
| JP | 2007013675 A | 1/2007 |

(56) References Cited

FOREIGN PATENT DOCUMENTS

| | | |
|---|---|---|
| JP | 2007506167 A | 3/2007 |
| JP | 2007089137 A | 4/2007 |
| JP | 2007158592 A | 6/2007 |
| JP | 2007174170 A | 7/2007 |
| JP | 2007228205 A | 9/2007 |
| JP | 2008011404 A | 1/2008 |
| JP | 2008016907 A | 1/2008 |
| JP | 2008508761 A | 3/2008 |
| JP | 2008283232 A | 11/2008 |
| JP | 2008283571 A | 11/2008 |
| JP | 2009027598 A | 2/2009 |
| JP | 2009512307 A | 3/2009 |
| JP | 2009522922 A | 6/2009 |
| JP | 2009171558 A | 7/2009 |
| JP | 2009277182 A | 11/2009 |
| JP | 2009544991 A | 12/2009 |
| JP | 2010516123 A | 5/2010 |
| JP | 2010530703 A | 9/2010 |
| JP | 2010539832 A | 12/2010 |
| JP | 2011087103 A | 4/2011 |
| JP | 2012517160 A | 7/2012 |
| JP | 2012523747 A | 10/2012 |
| KR | 1020030071815 | 9/2003 |
| KR | 1020030074386 A | 9/2003 |
| KR | 20040107152 A | 12/2004 |
| KR | 20040107401 A | 12/2004 |
| KR | 20050009376 A | 1/2005 |
| KR | 100809086 B1 | 3/2008 |
| KR | 20080083299 A | 9/2008 |
| KR | 20090098919 A | 9/2009 |
| KR | 20100015611 A | 2/2010 |
| KR | 20100028156 A | 3/2010 |
| RU | 99117925 A | 7/2001 |
| RU | 2189629 C2 | 9/2002 |
| RU | 2265960 C2 | 12/2005 |
| RU | 2290768 C1 | 12/2006 |
| RU | 2297663 C2 | 4/2007 |
| RU | 2312390 C2 | 12/2007 |
| RU | 2357279 C2 | 5/2009 |
| TW | I246841 B | 1/2006 |
| TW | I354908 | 12/2011 |
| TW | I355168 | 12/2011 |
| WO | WO-9750183 A1 | 12/1997 |
| WO | WO-9804973 A1 | 2/1998 |
| WO | WO-9832231 | 7/1998 |
| WO | WO-9832256 A1 | 7/1998 |
| WO | WO-0018017 | 3/2000 |
| WO | WO-0120786 | 3/2001 |
| WO | WO-02063461 A1 | 8/2002 |
| WO | WO-03046742 A1 | 6/2003 |
| WO | WO-03056703 A1 | 7/2003 |
| WO | WO-03105350 | 12/2003 |
| WO | WO-03105484 A1 | 12/2003 |
| WO | WO2004008735 A2 | 1/2004 |
| WO | WO-2004015948 A1 | 2/2004 |
| WO | WO-2004034589 A2 | 4/2004 |
| WO | WO-2004036824 A1 | 4/2004 |
| WO | WO-2004047019 A2 | 6/2004 |
| WO | WO-2004088988 A1 | 10/2004 |
| WO | WO-2004105300 | 12/2004 |
| WO | WO-2004109538 A1 | 12/2004 |
| WO | WO-2005022812 | 3/2005 |
| WO | WO-2005036753 A2 | 4/2005 |
| WO | WO-2005107123 | 11/2005 |
| WO | WO-2005112250 A2 | 11/2005 |
| WO | WO-2005120079 A2 | 12/2005 |
| WO | WO-2006013459 A1 | 2/2006 |
| WO | WO-2006020826 A2 | 2/2006 |
| WO | WO-2006036276 | 4/2006 |
| WO | WO-2006057938 A2 | 6/2006 |
| WO | WO-2006060036 A1 | 6/2006 |
| WO | WO-2006084503 A1 | 8/2006 |
| WO | WO-2006116102 A2 | 11/2006 |
| WO | WO-2006135877 A2 | 12/2006 |
| WO | WO-2006135878 A2 | 12/2006 |
| WO | WO2007042916 | 4/2007 |
| WO | WO-2007078253 A2 | 7/2007 |
| WO | WO-2007095550 A2 | 8/2007 |
| WO | WO-2007098397 A2 | 8/2007 |
| WO | WO-2007098480 A1 | 8/2007 |
| WO | WO-2007115129 | 10/2007 |
| WO | WO-2008011549 A2 | 1/2008 |
| WO | WO-2008023328 A3 | 4/2008 |
| WO | 2008086313 A1 | 7/2008 |
| WO | WO-2008085013 A1 | 7/2008 |
| WO | WO-2008144004 A1 | 11/2008 |
| WO | WO2008156390 A1 | 12/2008 |
| WO | WO-2009036378 | 3/2009 |
| WO | WO-2009065526 A1 | 5/2009 |
| WO | WO-2009137705 A2 | 11/2009 |
| WO | WO-2009143741 A1 | 12/2009 |
| WO | WO-2010041896 A2 | 4/2010 |
| WO | 2010051169 A2 | 5/2010 |
| WO | 2010091143 A1 | 8/2010 |
| WO | WO-2010117316 A1 | 10/2010 |
| WO | WO-2011038013 | 3/2011 |
| WO | WO-2011038034 A1 | 3/2011 |
| WO | WO-2011059286 A2 | 5/2011 |
| WO | WO-2011070552 A1 | 6/2011 |
| WO | WO-2011102792 A1 | 8/2011 |
| WO | WO-2012021540 | 2/2012 |
| WO | WO-2012109614 A1 | 8/2012 |

OTHER PUBLICATIONS

International Standard ISO/IEC 14496-12, Information Technology-Coding of audio-visual objects-Part 12: ISO base media file format, Corrected version of second edition, Oct. 1, 2005, 94 pages.

Wang, "On Random Access," Joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 22-26, 2002, 13 pages.

Apple Inc., "On the time-stamps in the segment-inbox for HTTP streaming (26.244, R9)," TSG-SA4#58 meeting, Vancouver, Canada, Apr. 2010, 5 pages.

Afzal et al., "Video Streaming over MBMS: A System Design Approach," Journal of Multimedia, vol. 1, No. 5, Aug. 2006, pp. 25-35.

International Search Report and Written Opinion—PCT/US2011/042447, ISA/EPO—Oct. 7, 2011.

Ying Chen et al: "Response to the CfP on HTTP Streaming: Adaptive Video Streaming based on AVC", 93 MPEG Meeting; Jul. 26, 2010-Jul. 30, 2010; Geneva; (Motion Picture Expert Group or ISO/IEC JTC1/SC29/WG11), No. M17909, Jul. 26, 2010, XP030046499.

3rd Generation Partnership Project; Technical Specification Group Services and System Aspects; Transparent end-to-end packet switched streaming service (PSS); 3GPP file format (3GP) (Release 9) 3GPP TS 26.244 V9.2.0, Jun. 23, 2010, pp. 47-49.

Universal Mobile Telecommunications System (UMTS); LTE; Transparent end-to-end Packet-switched Streaming Service (PSS); Protocols and codecs (3GPP TS 26.234 version 9.3.0 Release 9), Technical Specification, European Telecommunications Standards Institute (ETSI), 650, Route Des Lucioles; F-06921 Sophia-Antipolis; France, vol. 3GPP SA, No. V9.3.0, Jun. 1, 2010, XP014047290, pp. 1-178.

Call for Proposals on HTTP Streaming of MPEG Media,ISO/IEC JTC1/SC29/WG11 N11338, Apr. 2010,URL,http://www.3gpp.org/ftp/Inbox/LSs_from_external_bodies/ISO_JEC_JTC1_SG29_WG11/29n11262.zip, 29n112622.doc.

Open IPTV Forum Release 2 Specification HTTP Adaptive Streaming Draft V0.04.01, Apr. 26, 2010,URL,http://www.3gpp.org/ftp/tsg_sa/WG4_CODEC/TSGS4_58/Docs/S4-100332.zip, OIPF-DR-HAS-v0_04_01-2010-04-23.pdf.

Wiegand T., et al., "Coding Efficiency Improvement for SVC Broadcast in the Context of the Emerging DVB Standardization", Proc. of 17th European Signal Processing Conf., Aug. 2009,URL,http://www.eurasip.org/Proceedings/Eusipco/Eusipco2009/contents/papers/1569192498.pdf.

(56) References Cited

OTHER PUBLICATIONS

3GPP: "3rd Generation Partnership Project; Technical Specification Group Services and system Aspects; Multimedia Broadcast/Multicast Service (MBMS); Protocols and codecs (Release 6)", Sophia Antipolis, France, Jun. 1, 2005, XP002695256, Retrieved from the Internet: URL:http://www.etsi.org/deliver/etsi_ts/126300_126399/126346/06.01.00_60/ts_126346v060100p.pdf.
3GPP TSG-SA4 #57 S4-100015, IMS based PSS and MBMS User Service extensions, Jan. 19, 2010, URL : http://www.3gpp.org/ftp/tsg_sa/WG4_CODEC/TSGS4_57/docs/S4-100015.zip.
3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 10), 3GPP Competence Centre ; 650, Route Des Lucioles ; F-06921 Sophia-Antipolis Cedex ; France, vol. SA WG4, No. V10.0.0, Jun. 17, 2011, pp. 1-94, XP050553206, [retrieved on Jun. 17, 2011].
3rd Generation Partnership Project; Technical Specification Group Services and System Aspects; Transparent end-to-end Packet-switched Streaming Service (PSS);Protocols and codecs(Release 9) 3GPP TS 26.234 V9.3.0, Jun. 23, 2010 p. 85-102,URL,http://www.3gpp.org/ftp/TSG_SA/WG4_CODEC/TSGS4_59/Docs/S4-100511.zip,26234-930.zip.
Albanese, A., et al., "Priority Encoding Transmission", IEEE Transactions on Information Theory, vol. 42, No. 6, pp. 1-22, (Nov. 1996).
Alex Zambelli,"IIS Smooth Streaming Technical Overview", Microsoft Mar. 25, 2009, XP002620446, Retrieved from the Internet: URL:http://www.microsoft.com/downloads/en/ details.aspx"FamilyID=03d22583-3ed6-44da-8464-blb4b5ca7520, [retrieved on Jan. 21, 2011].
Amon P et al., "File Format for Scalable Video Coding", IEEE Transactions on Circuits and Systems for Video Technology, IEEE Service Center, Piscataway, NJ, US, vol. 17, No. 9, Sep. 1, 2007, pp. 1174-1185, XP011193013, ISSN: 1051-8215, DOI:10.1109/TCSVT.2007.905521.
Anonymous: [Gruneberg, K., Narasimhan, S. and Chen, Y., editors] "Text of ISO/IEC 13818-1:2007PDAM 6 MVC operation point descriptor", 90 MPEG Meeting; Oct. 26, 2009-Oct. 30, 2009; Xian; (Motion Picture Expertgroup or ISO/IEC JTC1/SC29/WG11), No. N10942, Nov. 19, 2009, XP030017441.
Anonymous: "Technologies under Consideration", 100. MPEG Meeting;Apr. 30, 2012-May 4, 2012; Geneva; (Motion Picture Expert Group or ISO/IEC JTC1 /SC29/WG11),, No. N12682, Jun. 7, 2012, XP030019156.
Anonymous: "Technologies under Consideration", 98 MPEG Meeting; Nov. 28, 2011-Dec. 2, 2011; Geneva; (Motion Picture Expert Group or ISO/IEC JTC1/SC29/WG11),, No. N12330, Dec. 3, 2011, XP030018825.
Anonymous: "Text of ISO/IEC 14496-12 3rd Edition", 83 MPEG Meeting; Jan. 14, 2008-Jan. 18, 2008; Antalya; (Motion Pictureexpert Group or ISO/IEC JTC1/SC29/WG11), No. N9678, Apr. 22, 2008, XP030016172.
Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11),, No. N11139, Jan. 22, 2010, XP030017636, ISSN: 0000-0030 the whole document.
Anonymous: "Text of ISO/IEC IS 23009-1 Media Presentation Description and Segment Formats", 98. MPEG Meeting; Nov. 28, 2011-Dec. 2, 2012; Geneva; (Motion Picture Expert Group or ISO/IEC JTC1/SC29/WG11),, No. N12329, Jan. 6, 2011, XP030018824.
ATIS: "PTV Content on Demand Service", IIF-WT-063R44, Nov. 11, 2010, pp. 1-124, XP055045168, Retrieved from the Internet: URL:ftp://vqeg.its.bldrdoc.gov/Documents/VQEG_Atlanta_Nov10/MeetingFiles/Liaison/IIF-WT-063R44_Content_on_Demand.pdf [retrieved on Nov. 22, 2012].
Bouazizi I., et al., "Proposals for ALC/FLUTE server file format (14496-12Amd.2)", 77. MPEG Meeting; Jul. 17, 2006-Jul. 21, 2006; Klagenfurt; (Motion Pictureexpert Group or ISO/IEC JTC1/SC29/WG11), No. N13675, Jul. 12, 2006, XP030042344, ISSN: 0000-0236.
Bross, B., et al., "High efficiency video coding (HEVC) text specification draft 7," Joint Collaborative Team on Video Coding (JCT-VC) of ITU-T SG16 WP3 and ISO/IEC JTC1/SC29/WG11 9th Meeting: Geneva, CH, Apr. 27, 2012-May 7, 2012, JCTVC-I1003_d2, XP030112373, (May 10, 2012), pp. 1-290.
Bross, B., et al., "High efficiency video coding (HEVC) text specification draft 8," Joint Collaborative Team on Video Coding (JCT-VC) of ITU-T SG16 WP3 and ISO/IEC JTC1/SC29/WG11 10th Meeting: Stockholm, SE, Jul. 11-20, 2012, JCTVC-J1003_d7, pp. 261.
Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11 8th Meeting: San José, CA, USA, Feb. 1-10, 2012, 259 pp.
Bross, et al., "High efficiency video coding (HEVC) text specification draft 6," Joint Collaborative Team on Video Coding (JCT-VC) of ITU-T SG16 WP3 and ISO/IEC JTC1/SC29/WG11 JCTVC-H1003, 7th Meeting: Geneva, CH, Nov. 21-30, 2011, pp. 259.
Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.
Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.
Chen Y.,et al., "Low-Complexity Asymmetric Multiview Video Coding", Multimedia and Expo, 2008 IEEE International Conference on, Jun. 2008, pp. 773-776.
Chikara S., et al., "Add-on Download Scheme for Multicast Content Distribution Using LT Codes", IEICE. B, Communications, Aug. 1, 2006, J89-B (8), pp. 1379-1389.
"Digital Video Broadcasting (DVB); Framing structure, channel coding and modulation for digital terrestrial television; ETSI EN 300 744" ETSI Standards, LIS, Sophia Antipolis Cedex, France, V1.6.1 , pp. 9, Jan. 10, 2009.
Fehn C., et al., "Asymmetric Coding of Stereoscopic Video for Transmission Over T-DMB", 3DTV Conference, May 2007, pp. 1-4.
Fernando, et al., "httpstreaming of MPEG Media—Response to CfP", 93 MPEG Meeting; Jul. 26, 2010-Jul. 30, 2010; Geneva; (Motion Picture Expert Group or ISO/IEC JTC1/SCE29/WG11), No. M17756, Jul. 22, 2010, XP030046346.
Frojdh P., et al., "Study on 14496-12:2005/PDAM2 ALU/ FLUTE Server File Format", 78.MPEG Meeting; Oct. 23, 2006-Oct. 27, 2006; Hangzhou; (Motion Pictureexpert Group or ISO/ IEC JTC1/SC29/WG11),, No. M13855, Oct. 13, 2006, XP030042523, ISSN: 0000-0233.
Gerard F., et al., "HTTP Streaming MPEG media—Response to CFP", 93. MPEG Meeting, Geneva Jul. 26, 2010 to Jul. 30, 2010.
Gil A., et al., "Personalized Multimedia Touristic Services for Hybrid Broadcast/Broadband Mobile Receivers," IEEE Transactions on Consumer Electronics, 2010, vol. 56 (1), pp. 211-219.
Hannuksela M.M., et al., "DASH: Indication of Subsegments Starting with SAP", 97. MPEG Meeting; Jul. 18, 2011-Jul. 22, 2011 ; Torino; (Motion Picture Expert Group or ISO/IEC JTC1/SC29/WG11) No. m21096, Jul. 21, 2011, XP030049659.
Hannuksela M.M., et al., "ISOBMFF: SAP definitions and 'sidx' box", 97. MPEG Meeting; Jul. 18, 2011-Jul. 22, 2011; Torino; (Motion Picture Expert Group or ISO/IEC JTC1/SC29/WG11) No. m21435, Jul. 22, 2011, XP030049998.
Hasan M A., et al., "Architecture for a Low Complexity Rate-Adaptive Reed-Solomon Encoder", IEEE Tranactions on Computer, IEEE Service Center, Los Alamitos, CA, US, vol. 44, No. 7, Jul. 1, 1995, pp. 938-942, XP000525729, ISSN: 0018-9340, DOI: 10.1109/12.392853.
Huawei et al., "Implict mapping between CCE and PUCCH for ACK/NACK TDD", 3GPP Draft: R1-082359, 3rd Generation Partnership Project (3GPP), Mobile Competence Centre; 650, Route

(56) References Cited

OTHER PUBLICATIONS

Des Lucioles ; F-06921 Sophia-Antipolis Cedex ; France, vol. RAN WG1, No. Warsaw, Poland, Jun. 24, 2008, XP050110650, [retrieved on Jun. 24, 2008].
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
Jiang J., "File Format for Scalable Video Coding", PowerPoint Presentation for CMPT 820, Summer 2008.
Kim J., et al., "Enhanced Adaptive Modulation and Coding Schemes Based on Multiple Channel Reporting for Wireless Multicast Systems", 62nd IEEE Vehicular Technology Conference, VTC-2005-FALL, Sep. 25-28, 2005, vol. 2, pp. 725-729, XP010878578, DOI: 1 0.1109/VETECF.2005.1558019, ISBN: 978-0-7803-9152-9.
Lee, J.Y., "Description of Evaluation Experiments on ISO/IEC 23001-6, Dynamic Adaptive Streaming over HTTP", ISO/IEC JTC1/SC29/WG11MPEG2010/N11450, Jul. 31, 2010, 16 pp.
Li, M., et al., "Playout Buffer and Rate Optimization for Streaming over IEEE 802.11 Wireless Networks", Aug. 2009, Worcester Polytechnic Institute, USA.
Luby, et al., "FLUTE-File Delivery over Unidirectional Transport", IETF RFC 3926, Oct. 2004, pp. 1-35.
Luby et, al. "Layered Coding Transport (LCT) Building Block", IETF RFC 5651, pp. 1-42, (Oct. 2009).
Luby et al., RaptorQ Forward Error Correction Scheme for Object Delivery draft-ietf-rmt-bb-fec-raptorq-00, Qualcomm, Inc. Jan. 28, 2010.
Luby, M., et, al. "Forward Error Correction (FEC) Building Block", IETF RFC 5052, pp. 1-31 (Aug. 2007).
Luby, M., et al., "Raptor Forward Error Correction Scheme for Object Delivery", IETF RFC5053, pp. 1-46 (Sep. 2007).
Luby M. et al., "RaptorQ Forward Error Correction Scheme for Object Delivery", IETF draft ietf-rmt-bb-fec-raptorq-04, Reliable Multicast Transport, Internet Engineering Task Force (IETF), Standard Workingdraft, Internet Society (ISOC), Aug. 24, 2010, pp. 1-68, XP015070705, [retrieved on Aug. 24, 2010].
Luby, M., et al., "Request for Comments: 3453: The Use of Forward Error Correction (FEC) in Reliable Multicast," Internet Article, [Online] Dec. 2002, pp. 1-19.
Luby M., "Simple Forward Error Correction (FEC) Schemes," draft-luby-rmt-bb-fec-supp-simple-00.txt, pp. 1-14, Jun. 2004.
Luby M., "LT Codes", Foundations of Computer Science, 2002, Proceedings, The 43rd Annual IEEE Symposium on, 2002.
Luby Qualcomm Incorporated, "Universal Object Delivery using RaptorQ; draft-luby-uod-raptorq-OO.txt", Internet Engineering Task Force (IETF), Standardworkingdraft, Internet Society (ISOC), Mar. 7, 2011 , pp. 1-10, XP015074424, [Retrieved on Mar. 7, 2011].
Makoto N., et al., "On Tuning of Blocking LU decomposition for VP2000 series" The 42th Information Processing Society of Japan Conference (1st term in 1991), Feb. 25, 1991, pp. 71-72, 4B-8.
Matsuoka H., et al., "Low-Density Parity-Check Code Extensions Applied for Broadcast-Communication Integrated Content Delivery", Research Laboratories, NTT DOCOMO, Inc., 3-6, Hikari-No-Oka, Yokosuka, Kanagawa, 239-8536, Japan, ITC-SS21, 2010 IEICE, pp. 59-63.
Michael G et al., "Improved low-density parity-check codes using irregular graphs", Information Theory, IEEE Transactions on,Feb. 2001, vol. 47, No. 2,pp. 585-598.
Miller G., et al., "Bounds on the maximum likelihood decoding error probability of low density parity check codes", Information Theory, 2000. Proceedings. IEEE International Symposium on, 2000, p. 290.
Morioka S., "A Verification Methodology for Error Correction Circuits over Galois Fields", Tokyo Research Laboratory, IBM Japan Ltd, pp. 275- 280, Apr. 22-23, 2002.

Moriyama, S., "5. Present Situation of Terrestrial Digital Broadcasting in Europe and USA", Journal of The Institute of Image Information and Television Engineers, Nov. 20, 1999, vol. 53, No. 11, pp. 1476-1478.
Motorola et al: "An Analysis of DCD Channel Mapping to BCAST File Delivery Sessions; OMA-CD-DCD-2007-0112-INP_DCD_Channel_Mapping_to_BCAST_File_Delivery", OMA-CD-DCD-2007-0112-INP_DCD_CHANNEL_MAPPI NG_TO_BCAST_FILE_DELIVERY, Open Mobile Alliance (OMA), 4330 La Jolla Village Dr., Suite 110 San Diego, CA 92122; USA OCt. 2, 2007, pp. 1-13, XP064036903.
Muramatsu J., et al., "Low density parity check matrices for coding of multiple access networks", Information Theory Workshop, 2003. Proceedings. 2003 IEEE , Apr. 4, 2003, pp. 304-307.
Murata, H., et.al., "32.2: A Real-Time 2-D to 3-D Image Conversion Technique Using Computed Image Depth", 1998 SID International Symposium Digest of Technical Papers, vol. 29, Issue 1, May 1998, pp. 919-923, [online], Internet URL: http://radioskot.ru/_fr/2/2Dto3D_conv32_0.pdf.
Nokia Corp., "Usage of 'mfra' box for Random Access and Seeking," S4-AHI127, 3GPP TSG-SA4 Ad-Hoc Meeting, Dec. 14th-16th, 2009, Paris, FR, 2 pp.
Ohashi A et al., "Low-Density Parity-Check (LDPC) Decoding of Quantized Data," Technical Report of the Institute of Electronics, Information and Communication Engineers, Aug. 23, 2002, vol. 102, No. 282, pp. 47-52, RCS2002-154.
Ono S., et al., "Ubiquitous Technology: High-Efficiency Coding of Moving Images—MEPG-4 and H.264--," 1st edition, Apr. 20, 2005, Ohmsha, Ltd., pp. 124, 125 and 134-136, ISBN: 4-274-20060-4.
Pantos, "HTTP Live Streaming draft-pantos-http-live-streaming-02", Informational, Internet-Draft, Intended status: Informational, Expires: Apr. 8, 2010, http://tools.ietf.org/html/draft-pantos-http-live-streaming-02, pp. 1-20, Oct. 5, 2009.
Pantos R et al., "HTTP Live Streaming; draft-pantos-http-live-streaming-OT.txt ", HTTP Live Streaming; Draft-Pant0s-HTTP-Live-Streaming-01.Txt, Internet Engineering Task Force, IETF; Standardworkingdraft, Internet Society (ISOC) 4, Rue Des Falaises CH—1205 Geneva, Switzerland, No. 1, Jun. 8, 2009, XP015062692.
Pyle, et al., "Microsoft http smooth Streaming: Microsoft response to the Call for Proposal on httpstreaming", 93 MPEG Meeting; Jul. 26, 2010-Jul. 30, 2010; Geneva; (Motion Picture Expert Group or ISO/IEC JTC1/SCE29/WG11), No. M17902, Jul. 22, 2010, XP030046492.
Qualcomm Europe S A R L: "Baseline Architecture and Definitions for HTTP Streaming", 3GPP Draft; S4-090603_HTTP_STREAMING_ARCHITECTURE, 3rd Generation Partnership Project (3GPP), Mobile Competence Centre; 650, Routes Des Lucioles; F-06921 Sophia-Antipolis Cedex; France, No. Kista; 20090812, Aug. 12, 2009, XP 050356889.
Qualcomm Incorporated: "Adaptive HTTP Streaming: Complete Proposal", 3GPP TSG-SA4 AHI Meeting S4-AHI170, Mar. 2, 2010, URL, http://www.3gpp.org/FTP/tsg_sa/WGA_CODEC/Ad-hoc_MBS/Docs_AHI/S4-AHI170.zip, S4-AHI70_CR_AdaptiveHTTPStreaming-Full.doc.
Qualcomm Incorporated: "Corrections to 3GPP Adaptive HTTP Streaming", 3GPP TSG-SA4 #59 Change Request 26.234 CR0172 S4-100403, Jun. 16, 2010, URL, http://www.3gpp.org/FTP/tsg_sa/WG4_CODEC/TSGS4_59/Docs/S4-100403.zip, S4-100403_CR_26234-0172-AdaptiveHTTPStreaming-Rel-9.doc.
Qualcomm Incorporated: "RatorQ Technical Overview", pp. 1-12, Oct. 1, 2010.
Qualcomm Incorporated: "RatorQ Forward Error Correction Scheme for Object Delivery draft-ieft-rmt-bb-fec-raqtorq-04,", Internet Engineering Task Force, IEFT, pp. 1-68, Aug. 24, 2010.
Qualcomm Incorporated: "Use Cases and Examples for Adaptive httpstreaming", 3GPP Draft; S4-100408-USECASES-HSD, 3rd Generation Partnership Project (JGPP), Mobile Competence Centre; 650, Routes Des Lucioles; F-06921 Sophia-Antipolis Cedex; France, vol. SA WG4, No. Prague, Czech Republic; 20100621, Jun. 17, 2010, pp. 1-22, XP050438085, [retrieved on Jun. 17, 2010].

(56) References Cited

OTHER PUBLICATIONS

Ramsey B, "HTTP Status: 206 Partial Content and Range Request," May 5, 2008 obtained at http://benramsey.com/blog/2008/05/206-partial-content-and-range-requests/.

Realnetworks Inc et al., "Format for HTTP Streaming Media Presentation Description", 3GPP Draft; S4-100020, 3rd Generation Partnership Project (3GPP), Mobile Competence Centre; 650, Routes Des Lucioles; F-06921 Sophia-Anti Polis Cedex; France, vol. SA WG4, No. ST Julians, Malta; 20100125, Jan. 20, 2010, XP050437753, [retrieved on Jan. 20, 2010].

"Report on Research and Development for Image Production and Display Using Digital Techniques," Mar. 2008, Digital Content Association of Japan, pp. 60-66.

Research in Motion UK Limited: "An MPD delta file for httpstreaming", 3GPP Draft; S4-100453, 3rd Generation Partnership Project (SGPP), Mobile Competence Centre; 650, Routes Des Lucioles; F-06921 Sophia-Antipolis Cedex; France, vol. SA WG4, No. Prague, Czech Republic; 20100621, Jun. 16, 2010, XP050438066, [retrieved on Jun. 16, 2010].

Rhyu, et al., "Response to Call for Proposals on httpstreaming of MPEG Media", 93 MPEG Meeting; Jul. 26, 2010-Jul. 30, 2010; Geneva; (Motion Picture Expert Group or ISO/IEC JTC1/SCE29/WG11), No. M17779, Jul. 26, 2010, XP030046369.

Roca, V. et, al. "Low Density Parity Check (LDPC) Staircase and Triangle Forward Error Correction (FEC) Schemes", IETF RFC 5170 (Jun. 2008), pp. 1-34.

Roumy A., et al., "Unequal Erasure Protection and Object Bundle Protection with the Generalized Object Encoding Approach", Inria-00612583, Version 1, Jul. 29, 2011, 25 pages.

Samukawa, H. "Blocked Algorithm for LU Decomposition" Journal of the Information Processing Society of Japan, Mar. 15, 1993, vol. 34, No. 3, pp. 398-408.

Schulzrinne, et al., "Real Time Streaming Protocol (RTSP)" Network Working Group, Request for Comments: 2326, Apr. 1998, pp. 1-92.

Stockhammer T., et al., "DASH: Improvements on Representation Access Points and related flags", 97. MPEG Meeting; Jul. 18, 2011-Jul. 22, 2011; Torino; (Motion Picture Expert Group or ISO/IEC JTC1/SCE29/WG11), No. m20339, Jul. 24, 2011, XP030048903.

Sullivan G.J., et.al., "Draft AVC amendment text to specify Constrained Baseline profile, Stereo High profile, and frame packing SEI message", Jun. 28-Jul. 3, 2009, pp. 1-22, Joint Video Team (JVT) of ISO/IEC MPEG & ITU-T VCEG (ISO/IEC JTC1/SC29/WG11 and ITU-T SG16 Q.6), Document: JVT-AE204, Internet <URL: http://wftp3.itu.int/av-arch/jvt-site/2009_06_London/JVT-AE204.zip>.

Telefon AB LM Ericsson, et al., "Media Presentation Description in httpstreaming", 3GPP Draft; S4-100080-MPD, 3rd Generation Partnership Project (3GPP), Mobile Competence Centre; 650, Routes Des Lucioles; F-06921 Sophia-Antipolis Cedex; France, vol. SA WG4, No. St Julians, Malta; 20100125, Jan. 20, 2010, XP050437753, [retrieved on Jan. 20, 2010].

Tetsuo M., et al., "Comparison of Loss Resilient Ability between Multi-Stage and Reed-Solomon Coding", Technical report of IEICE. CQ, Communication Quality, vol. 103 (178), Jul. 4, 2003, pp. 19-24.

U.S. Appl. No. 12/840,146, by Ying Chen et al., filed Jul. 20, 2010.

Wadayama T, "Introduction to Low Density Parity Check Codes and Sum-Product Algorithm," Technical Report of the Institute of Electronics, Information and Communication Engineers, Dec. 6, 2001, vol. 101, No. 498, pp. 39-46, MR2001-83.

Watson, M., et, al. "Asynchronous Layered Coding (ALC) Protocol Instantiation", IETF RFC 5775, pp. 1-23, (Apr. 2010).

Watson M., et al., "Forward Error Correction (FEC) Framework draft-ieft-fecframe-framework-11," 2011, pp. 1-38, URL,http://tools.ietf.org/pdf/draft-ietf-fecframe-framework-11.pdf.

Watson M., et al., "Raptor FEC Schemes for FECFRAME draft-ieft-fecframe-raptor-04," 2010, pp. 1-21, URL,http://tools.ietf.org/pdf/draft-ietf-fecframe-raptor-04.pdf.

Wiegand, T., et al., "WD2: Working Draft 2 of High-Efficiency Video Coding", 20110128, No. JCTVC-D503, Jan. 28, 2011, XP002679642, Retrieved from the Internet: URL: http://wftp3.itu.int/av/arch/jctvc-site/2011_01_D_Daegu/ [retrieved on Jul. 11, 2012], pp. 153.

Wiegand, T., et al.,"WD3: Working Draft 3 of High-Efficiency Video Coding", Document JCTVC-E603, 5th Meeting: Geneva, CH, Mar. 16-23, 2011, pp. 193.

Wiegand, T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, pp. 137.

Written Opinion, PCT/US2008/060510—International Search Authority—Aug. 1, 2008.

Yamazaki M., et al., "Multilevel Block Modulation Codes Construction of Generalized DFT," Technical Report of the Institute of Electronics, Information and Communication Engineers, Jan. 24, 1997, vol. 96, No. 494, pp. 19-24, IT96-50.

3rd Generation Partnership Project;Technical Specification Group Services and System Aspects; Transparent end-to-end packet switched streaming service (PSS);3GPP file format (3GP) (Release)Jun. 23, 2010, 3GPP TS 26.244 V9.2.0, Jun. 23, 2010, URL, http://www.3gpp.org/FTP/tsg_sa/WG4_CODEC/TSGS4_59/Docs/S4-100511.zip 26244-920.zip.

Anonymous: "Text of ISO/IEC 14496-12:2008/PDAM 2 & ISO/IEC 15444-12:2008/PDAM 2 Sub-track selection & switching", 91. Mpeg Meeting; Jan. 18, 2010-Jan. 22, 2010; Kyoto; (Motion Picture Expertgroup or ISO/IEC JTC1/SC29/WG11), No. N11137, Jan. 22, 2010, XP030017634, ISSN: 0000-0030.

* cited by examiner

SIGNALING VIDEO SAMPLES FOR TRICK MODE VIDEO REPRESENTATIONS

This application claims the benefit of U.S. Provisional Application No. 61/359,748, filed Jun. 29, 2010, U.S. Provisional Application No. 61/366,343, filed Jul. 21, 2010, and U.S. Provisional Application No. 61/363,884, filed Jul. 13, 2010, the entire contents of each of which are incorporated herein by reference.

CROSS-REFERENCE TO RELATED APPLICATIONS

This application is related to the following co-pending U.S. patent applications: U.S. patent application Ser. No. 12/908,537, entitled "SIGNALING RANDOM ACCESS POINTS FOR STREAMING VIDEO DATA," by Ying Chen et al., filed concurrently herewith, assigned to the assignee hereof, and expressly incorporated by reference herein in its entirety.

TECHNICAL FIELD

This disclosure relates to the transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

Efforts have been made to develop new video coding standards based on H.264/AVC. One such standard is the scalable video coding (SVC) standard, which is the scalable extension to H.264/AVC. Another standard is the multi-view video coding (MVC) standard, which has become the multiview extension to H.264/AVC. A version of the AVC standard is described in JVT-AD007, "Editors' draft revision to ITU-T Rec. H.264 I ISO/IEC 14496-10 Advanced Video Coding—in preparation for ITU-T SG 16 AAP Consent (in integrated form)", 30$^{th}$ JVT meeting, Geneva, CH, February 2009", available from http://wftp3.itu.int/av-arch/jvt-site/2009_01_Geneva/JVT-AD007.zip, which integrates the SVC and MVC integrated in the AVC specification.

SUMMARY

This disclosure describes techniques relevant to transport of media data using a streaming protocol, such as hypertext transfer protocol (HTTP) streaming. In particular, the techniques of this disclosure are directed to signaling characteristics of random access points (RAPs) in media content. A random access point generally corresponds to a point at which a decoder may begin properly decoding a video representation without reference to earlier data, such as encoded units temporally preceding the random access point. That is, random access points may comprise independent decodable units, e.g., intra-coded frames or slices of video data.

Streaming (e.g., HTTP streaming) generally involves the transfer of data from a source device to a destination device. In accordance with the techniques of this disclosure, a source device may signal characteristics of open decoding refresh (ODR) frames, in addition to instantaneous decoding refresh (IDR) frames. By signaling these characteristics, the destination device may generate a request to commence playback of a video representation contained in a stream of video data, at an ODR frame. In this manner, a user of the destination device may request to begin or jump to a particular temporal location of the video representation, and the destination device may request streaming of a portion of the video representation, containing an IDR or ODR picture that is nearest to the requested temporal location. Thus, rather than being limited to initiating playback and/or streaming of a video representation at an IDR picture, a destination device in accordance with the techniques of this disclosure may initiate the stream at either an IDR or ODR, which may reduce bandwidth consumption and/or enable more frequent random access points and/or video switching points, to improve the user's viewing experience.

This disclosure also provides techniques for signaling characteristics of intra-coded pictures, such that a destination device can retrieve and present the intra-coded pictures in a trick mode. A trick mode generally corresponds to a high speed playback mode, e.g., fast forward or rewind. In such modes, the destination device may only playback a subset of the available frames in a video representation. Accordingly, the destination device need only retrieve the frames to be played in the trick mode. Thus, in accordance with the techniques of this disclosure, the destination device may generate requests for the intra-coded frames based on the signaled characteristics, which may reduce bandwidth consumption and allow for trick mode playback when media is transferred using a network streaming protocol.

For example, a method is described herein. The method includes receiving, at a client device from a server device, an indication of an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The method further includes sending, by the client device, a request to the server device to retrieve a stream of media data starting with the media segmentation that contains the indicated ODR RAP frame.

According to another example, a device is described herein. The device includes means for receiving, from a server device, an indication of an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The device further includes means for sending a request to the server device to retrieve a stream of media data starting with the indicated ODR RAP frame.

According to another example, a computer-readable storage medium is described herein. The storage medium includes instructions that, when executed, cause a processor of a client computing device to receive, at a client device from a server device, an indication of an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The instructions further cause the client computing device to send, by the client device, a request to the server device to retrieve a stream of media data starting with the media segmentation that contains the indicated ODR RAP frame.

According to another example, a device that includes one or more processors is described herein. The one or more processors are configured to receive an indication of an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The one or more processors are further configured to send a request to the server device to retrieve a stream of media data starting with the media segmentation that contains the indicated ODR RAP frame.

According to another example, a method is described herein. The method includes receiving a sequence of encoded video frames comprising an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The method further includes generating an indication of a location of the ODR RAP within the sequence of encoded video frames. The method further includes outputting the indication.

According to another example, a device is described herein. The device includes means for receiving a sequence of encoded video frames comprising an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The device further includes means for generating an indication of a location of the ODR RAP within the sequence of encoded video frames. The device further includes means for outputting the indication.

According to another example, a computer readable storage medium is described herein. The computer-readable storage medium includes instructions that, when executed, cause one or more processors of a source device to receive a sequence of encoded video frames comprising an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The instructions further cause the source device to generate an indication of a location of the ODR RAP within the sequence of encoded video frames. The instructions further cause the source device to output the indication.

According to another example, a device including one or more processors is described herein. The one or more processors are configured to receive a sequence of encoded video frames comprising an open decoding refresh (ODR) random access point (RAP) frame of a media segmentation, wherein at least one frame of the media segmentation following the ODR RAP frame in decoding order may not be correctly decoded, and wherein each frame of the media segmentation following the ODR RAP frame in display order can be correctly decoded without relying on content of frames prior to the ODR RAP in display order. The one or more processors are further configured to generate an indication of a location of the ODR RAP within the sequence of encoded video frames. The one or more processors are further configured to output the indication.

According to another example, a method is described herein. The method include receiving, at a client device from a server device, an indication of at least one byte range within a media segmentation that represents a video presentation configured to be displayed at a first playback speed wherein at least one intra-coded frame (I-frame) occurs within the at least one byte range. The method further includes sending, by the client device, a request to the server device to retrieve media data within the at least one byte range. The method further includes using the retrieved media data within the at least one byte range to present a high speed version of the video representation that includes the at least one I-frame at a second playback speed higher than the first playback speed.

According to another example, a device is described herein. The device includes means for receiving, at a client device from a server device, an indication of at least one byte range within a media segmentation that represents a video presentation configured to be displayed at a first playback speed wherein at least one intra-coded frame (I-frame) occurs within the at least one byte range. The device further includes means for sending, by the client device, a request to the server device to retrieve media data within the at least one byte range. The device further includes means for using the retrieved media data within the at least one byte range to present a high speed version of the video representation that includes the at least one I-frame at a second playback speed higher than the first playback speed.

According to another example, a computer readable storage medium is described herein. The computer readable storage medium stores instructions configured to cause a computing device to receive, at a client device from a server device, an indication of at least one byte range within a media segmentation that represents a video presentation configured to be displayed at a first playback speed wherein at least one intra-coded frame (I-frame) occurs within the at least one byte range. The instructions are further configured to cause the computing device to send, by the client device, a request to the server device to retrieve media data within the at least one byte range. The instructions are further configured to cause the computing device to use the retrieved media data within the at least one byte range to present a high speed version of the video representation that includes the at least one I-frame at a second playback speed higher than the first playback speed.

According to another example, a device is described herein. The device includes at least one processor. The at least one processor is configured to receive an indication of at least one byte range within a media segmentation that represents a video presentation configured to be displayed at a first playback speed wherein at least one intra-coded frame (I-frame) occurs within the at least one byte range. The at least one processor is further configured to send a request to the server device to retrieve media data within the at least one byte range. The at least one processor is further configured to use the retrieved media data within the at least one byte range to present a high speed version of the video representation that includes the at least one I-frame at a second playback speed higher than the first playback speed.

According to another example, a method is described herein. The method includes receiving a sequence of encoded video frames comprising at least one inter-coded frame (I-frame). The method further includes generating an indication of a byte range within the sequence of encoded video frames, wherein at least one I-frame occurs within the at least one byte range. The method further includes outputting the indication of a byte range within the sequence of encoded video frames.

According to another example, a device is described herein. The device includes means for receiving a sequence of encoded video frames comprising at least one inter-coded frame (I-frame). The device further includes means for generating an indication of a byte range within the sequence of encoded video frames, wherein at least one I-frame occurs within the at least one byte range. The device further includes means for outputting the indication of a byte range within the sequence of encoded video frames.

According to another example, a computer readable storage medium is described herein. The computer readable storage medium stores instructions configured to cause a computing device to receive a sequence of encoded video frames comprising at least one I-frame. The instructions further cause the computing device to generate an indication of a byte range, wherein at least one I-frame occurs within the at least one byte range. The instructions further cause the computing device to output the indication of a byte range within the sequence of encoded video frames.

According to another example, a device is described herein. The device includes one or more processors. The one or more processors are configured to receive a sequence of encoded video frames comprising at least one I-frame. The one or more processors are further configured to generate an indication of a byte range within the sequence of encoded video frames, wherein at least one I-frame occurs within the at least one byte range. The one or more processors are further configured to output the indication of a byte range within the sequence of encoded video frames.

The details of one or more examples are set forth in the accompanying drawings and the description below. Other features, objects, and advantages will be apparent from the description and drawings, and from the claims.

DETAILED DESCRIPTION

Figure 1:
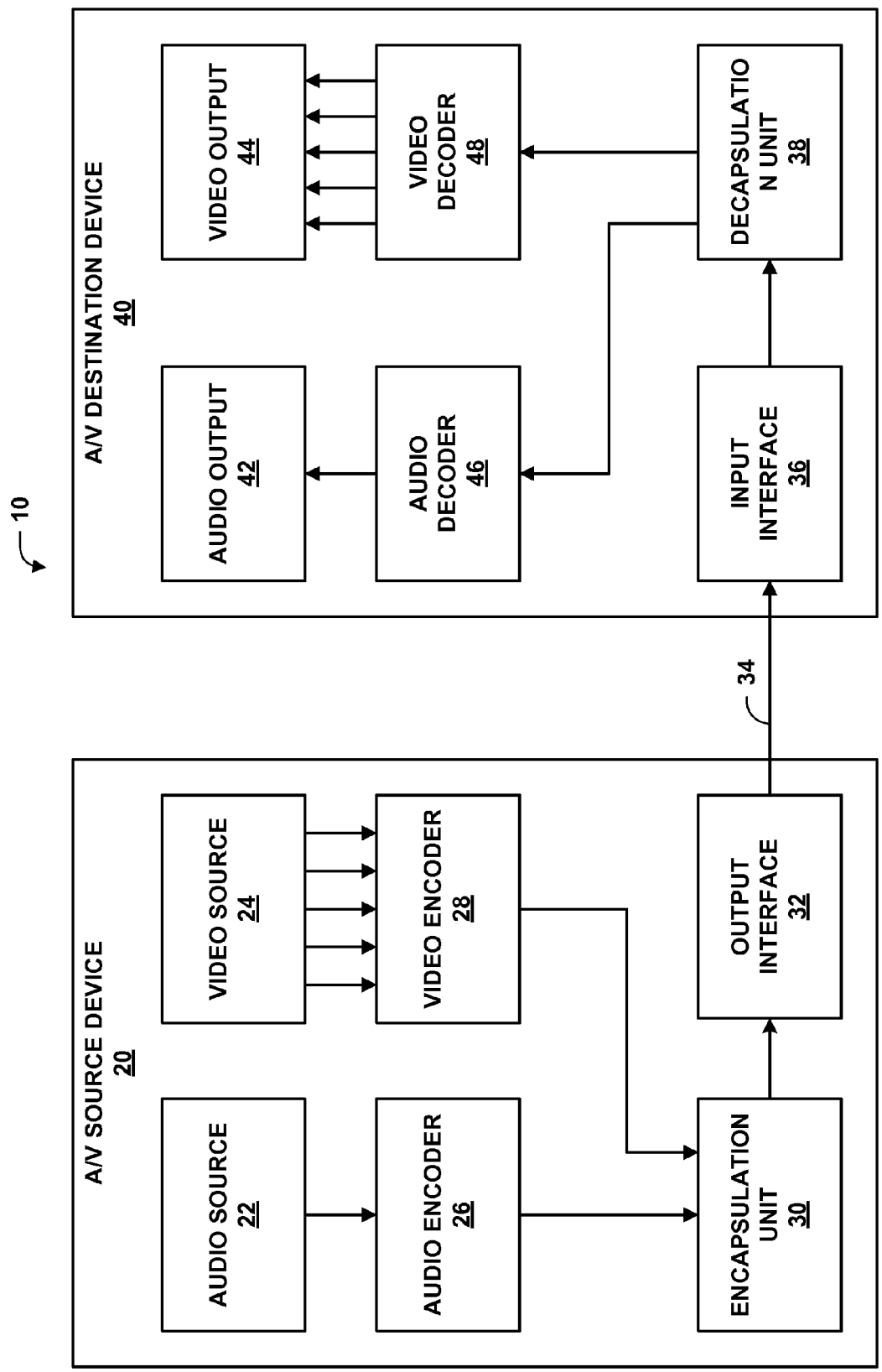
FIG. 1 is a block diagram illustrating an example system in which an audio/video (A/V) source device transports audio and video data to an A/V destination device.

The techniques of this disclosure are generally directed to supporting transport of video data using a streaming protocol, such as, for example, hypertext transfer protocol (HTTP) streaming. In general, references to HTTP may include references to HTTP streaming in this disclosure.

This disclosure refers to two specific types of random access points (RAPs) of a video representation. In particular, this disclosure describes instantaneous decoding refresh (IDR) RAPs and open decoding refresh (ODR) RAPs. An IDR access point is an independently decodable Intra frame of a closed GOP. A closed GOP is a grouping of frames of a video representation that does not include any frames that depend on frames prior to the GOP in either decoding or presentation order to be correctly decodable.

An open GOP is a GOP for which pictures preceding an initial independently decodable frame (I-frame) of the GOP in display (output) order but following the I-frame in decoding order may not be correctly decodable. For example, an open GOP may include one or more frames that depend at least in part on content of at least one frame outside of the open GOP. In some examples of an open GOP, an I-frame of an open GOP may be used as a random access point for the commencement of playback of a video representation. For example, if all the frames following an initial I-frame in display order can be correctly decoded, the I-frame may be used as an RAP. Such an RAP may be referred to as an ODR RAP.

Frames of a video representation may be are arranged into one or more GOP. The one or more GOP may be arranged into one or more video fragments. The one or more fragments may be arranged into one or more segments. In some examples, a plurality of segments may form a video representation.

Streaming services. such as HTTP streaming services, may allow for a client device to make an HTTP request to retrieve one or more GOP, fragments, segments, or an entire video representation from a server device. The server device may contain multiple representations of media content. In one example, such a request may include an HTTP GET request. An HTTP GET request may provide a client device access to content stored on a server device by specifying a uniform resource locator (URL) of one or more media segmentations of a video representation (e.g., GOP, fragment, segment, or video representation-level media files). In some examples, an HTTP GET request may specify a byte range within a media file instead of requesting an entire media file. Such an HTTP GET request may be referred to as a partial GET request. As described herein, the phrase "media segmentation" refers to any file, whether a fragment, segment, or video representation level media segmentation, that is retrievable according to a streaming protocol request such as an HTTP GET or partial GET request.

In some examples, the various forms of media content described herein may be stored in a server in the form of one or more media segmentations. In some examples, a server device may be configured to provide signaling information to facilitate the HTTP streaming service. According to one aspect of this disclosure, a server device may signal an open decoding refresh (ODR) random access point (RAP) for a media segmentation (e.g., fragment, segment, representation specific media segmentation) of a video representation. According to the techniques of this disclosure, a client device may communicate a request to a server device for the streaming of media data based on signaling of the ODR RAP. By signaling ODR RAP for a video representation, a client device may select from among more temporal positions of a video representation for commencement of streaming, decoding and/or playback of the video representation.

In some examples, the source device may signal whether a media segmentation contains an ODR RAP or not in the case IDR is not contained in a fragment or segment. Accordingly, playback of a video representation may commence at a temporal location associated with a media segmentation (e.g., a fragment or segment of a video representation, or an entire video representation) that includes an ODR RAP, if no media segmentation that includes an IDR RAP is available near to the desired temporal location.

In particular, the source device may signal a byte offset to an ODR RAP of a media segmentation. The media segmentation may be independently addressable using a uniform resource locator (URL) or uniform resource name (URN) specific to the video fragment. By signaling the byte offset to the ODR RAP in the video fragment, the client device may construct a GET request comprising a byte range starting at the ODR RAP and ending at the end of the media segmentation, in one example.

According to another aspect of this disclosure, a server device may signal a byte range for at least one I-frame of a video representation. A client device may communicate a request to a server device to retrieve the at least one I-frame based on the signaled byte range, and use the retrieved I-frame to provide a high speed version of a video content that includes the at least one I-frame. A high speed version of a video content may support a trick mode of a video representation, such as a fast forward or fast rewind. By directly signaling a byte range for at least one I-frame of a video presentation, a high speed version may be provided without requesting a full video representation the I-frames belong to, or without requesting an alternate version of a video representation specifically created for high speed playback. Furthermore, these techniques allow for providing a high speed version of a video representation, while minimizing an amount of data that may be streamed, decoded, and/or played back.

According to this aspect of the disclosure, a server device may signal an indication of one or more byte ranges within one or more media segmentations that represent media content. At least one intra-coded frame (I-frame) may occur within each of the one or more signaled byte ranges. A client device may, based on the signaled indication of the one or more byte ranges, submit a request (e.g., an HTTP GET or partial GET request) to retrieve media data within the byte ranges. The client device may consecutively present two or more I-frames that occur with at least one of the one or more signaled byte ranges that are temporally separated by at least one intra-coded frame, to present the video presentation at a relatively high speed. Such a representation may be considered a high speed version of the media content.

The 3rd Generation Partnership Project (3GPP) is a collaboration between groups of telecommunications associations, to make a globally applicable third-generation (3G) mobile phone system specification within the scope of the International Mobile Telecommunications-2000 project of the International Telecommunication Union (ITU). 3GPP specifications are based on evolved Global System for Mobile Communications (GSM) specifications. 3GPP standardization encompasses Radio, Core Network and Service architecture. In some examples, the techniques of this disclosure are described herein using examples and terms consistent with the 3GPP protocol specification. These examples and terms are merely provided for exemplary purposes, other protocol specifications for streaming of video data are also contemplated and consistent with this disclosure.

In some examples according to HTTP streaming, segmentation files may be arranged into a number of different representations that each correspond to a particular program (e.g., movie, television show, or other video program). 3GPP files may each correspond to these different representations of a program and/or segments or fragments of a presentation of a program.

A video representation (e.g., 3GPP file) may be arranged in a number of movie fragments. The movie fragments may each include a number of frames, or pictures, of a video representation. Fragments of a 3GPP video representation may be individually retrievable using an HTTP GET or partial GET request that may refer to a uniform resource locator (URL) or a uniform resource name (URN) of a 3GPP file.

An HTTP client may change representations during playback, for example when network conditions change, or when user control input is detected. For example, when a high amount of bandwidth is available, the client may retrieve 3GPP files of a relatively higher quality presentation, whereas when a lower amount of bandwidth is available, the client may retrieve 3GPP files of a relatively lower quality presentation. Similarly, a user may indicate a desired change in video quality. A user may also direct a client to pause, stop, seek (e.g., fast forward, rewind), or scan (indicate a desired start point) for playback of a video representation.

It may be desirable for an HTTP server to provide a subset of information available for one or more movie presentation to allow an HTTP client to select different representations, or portions of representations, for streaming. Such information may be referred to as header information. Header information may be specific to a program, specific to a representation of the program or a portion of the representation, or to a movie fragment or segment of a representation.

In one example according to 3GPP, header information may be contained in a media presentation description (MPD) file. The MPD file may signal characteristic elements of a number of representations of video data such as, for example, bit rate, frame rate, resolution, interlaced or progressive scan type, encoding type, (e.g., MPEG-1, MPEG-2, H.263, MPEG-4/H.264 or any other video codec), access points, or other characteristics.

Movie fragments may include a number of Groups of Pictures (GOP). A GOP may or may not include random access points (RAPs) for commencement of decoding and/or playback.

This disclosure describes techniques for the signaling of ODR access points in the context of HTTP streaming applications. The techniques of this disclosure may provide one or more advantages. For example, signaling of ODR access points in addition to IDR access points may allow for improvements in scan or seek functionality by providing finer granularity of control for initiating streams in accordance with HTTP streaming over known techniques that provide for the signaling of IDR access points. The techniques of this disclosure may also provide advantages when streaming of more complex video programs that include a high level of inter-frame content dependence for decoding, because more access points may be provided, thereby improving scan and/or seek functionality for HTTP streaming. The techniques of this disclosure may provide further advantages, because by signaling one or more ODR access points in header information of a segmentation file, a client device may request a stream of media data starting at an ODR access point itself, or an open GOP that includes the ODR access point, thereby providing finer granularity in selection of a start point for streaming/decoding/playback of video represented by a segmentation file. These techniques may also be beneficial over prior techniques by reducing an amount of data to be streamed for playback of a video representation.

In some examples, the techniques of this disclosure provide for the signaling of ODR access points and/or other information in header information of a segmentation file. In one example, ODR access points may be signaled in a segment index box (SIDX) of a movie representation or segment. The segmentation file may be formatted according to the ISO Base Media File Format, or any other type of segmentation file, including extensions of the ISO Base Media File Format such as, for example, scalable video coding (SVC), advanced video coding (AVC), and/or Multiview Video Coding (MVC) and the like. The techniques of this disclosure may further provide for signaling of other information related to scan and/or seek functionality, which are described in further detail below.

The techniques of this disclosure further provide for the signaling by an HTTP server device of a byte range of one or more intra-coded frames (I-frames) for purposes of scan functionality. For example, a destination device may display a high-speed version of a video representation for purposes of fast forward or rewind, also known as a trick mode for presentation of video. According to these techniques, a client device may, based on the signaling of I-frame byte ranges, request and/or decode only signaled I-frames of a video representation independent of other frames not needed to present a high speed version of a video representation. For example, a client device may specifically request (e.g., by one or more HTTP partial GET requests) one or more I-frames that occur within signaled byte ranges. The client device may consecutively present two or more I-frames of the retrieved media data to present the video content at a relatively high speed. The two or more I-frames may be temporally separated by at least one inter-coded frame (e.g., B or P-frames). By retrieving, decoding, and displaying only the signaled I-frames, the client device may provide a user with a high-speed version of a video representation for purposes of fast-forward or rewind operations. In some examples, the signaled I-frames may include IDR and/or ODR access points.

Byte ranges for I-frames of a video representation may be signaled in header information of various coding units (e.g., media segmentations). For example, a source device may signal the byte ranges of I-frames at the video level (e.g., within an MPD file), the representation level, the segment level, the fragment level, or other level of header information of a media presentation. These techniques may provide one or more advantages. For example, a destination device may execute high-speed playback of a video representation in the context of a streaming protocol, such as HTTP streaming without creating, storing, and/or transmitting a high speed version of the video representation. In addition, these techniques may be advantageous, because a client device may present a user with either or both fast forward and fast rewind playback based on signaled I-frames.

FIG. 1 is a block diagram illustrating an example system 10 in which audio/video (A/V) source device 20 transports audio and video data to A/V destination device 40. A/V source device 20 may also be referred to as a "source video device." System 10 of FIG. 1 may correspond to a video teleconference system, a server/client system, a broadcaster/receiver system, or any other system in which video data is sent from a source device, such as A/V source device 20, to a destination device, such as A/V destination device 40. A/V destination device 40 may also be referred to as a "destination video device" or a "client device." In some examples, A/V source device 20 and A/V destination device 40 may perform bidirectional information exchange. That is, A/V source device 20 and A/V destination device 40 may be capable of both encoding and decoding (and transmitting and receiving) audio and video data. In some examples, audio encoder 26 may comprise a voice encoder, also referred to as a vocoder.

A/V source device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit, or any other source of video data.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured by audio source 22 contemporaneously with video data captured by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. A/V source device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

The techniques of this disclosure are generally directed to the transport of encoded multimedia (e.g., audio and video) data, and reception and subsequent interpretation and decoding of the transported multimedia data. The techniques of this disclosure may be applied to transport of video data of various standards and extensions such as, for example, scalable video coding (SVC), advanced video coding (AVC), ISO base media file format, or Multiview Video Coding (MVC) data, or other video data. In some examples, video source 24 may provide a plurality of views of a scene to video encoder 28. In some examples, multiple views of video data may be useful for generating three-dimensional video data to be used by a three-dimensional display, such as a stereoscopic or autostereoscopic three-dimensional display.

A/V source device 20 may provide a "service" to A/V destination device 40. A service may generally correspond to a subset of available views of MVC data. For example, multiview video data may be available for eight views, ordered zero through seven. One service may correspond to stereo video having two views, while another service may correspond to four views, and still another service may correspond to all eight views. In general, a service corresponds to any combination (that is, any subset) of the available views. A service may also correspond to a combination of available views as well as audio data.

Each individual stream of data (whether audio or video) is referred to as an elementary stream. An elementary stream is a single, digitally coded (possibly compressed) component of a program. For example, the coded video or audio part of the program can be an elementary stream. An elementary stream may be converted into a packetized elementary stream (PES) before it is multiplexed into a program stream or transport stream. Within the same program, a stream ID is used to distinguish the PES-packets belonging to one elementary stream from the other. The basic unit of data of an elementary stream is a packetized elementary stream (PES) packet. Thus each view of MVC video data corresponds to respective elementary streams. Similarly, audio data corresponds to one or more respective elementary streams.

In the example of FIG. 1, encapsulation unit 30 receives elementary streams comprising video data from video encoder 28 and elementary streams comprising audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

A "program," as used in this disclosure, may comprise a combination of audio data and video data, e.g., an audio elementary stream and a subset of available views delivered by a service of A/V source device 20. Each PES packet includes a stream_id that identifies the elementary stream to which the PES packet belongs. Encapsulation unit 30 may assemble elementary streams into constituent program streams or transport streams. A program stream and a transport stream are two alternative multiplexes targeting different applications.

In general, a program stream includes data for one program, while a transport stream may include data for one or more programs. Encapsulation unit 30 may encode either or both of a program stream or a transport stream, based on a service being provided, a medium into which the stream will be passed, a number of programs to be sent, or other considerations. For example, when the video data is to be encoded in a storage medium, encapsulation unit 30 may be more likely to form a program stream, whereas when the video data is to be streamed over a network, broadcast, or sent as part of video telephony, encapsulation unit 30 may be more likely to use a transport stream.

Encapsulation unit 30 receives PES packets for elementary streams of a program from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units contain the core compression engine and may comprise block, macroblock, and/or slice levels. Other NAL units are non-VCL NAL units.

A NAL unit including video data in its payload may comprise various granularity levels of video data. For example, a NAL unit may comprise a block of video data, a macroblock, a plurality of macroblocks, a slice of video data, or an entire frame of video data.

In general, an access unit may comprise one or more NAL units for representing a frame of video data, as well audio data corresponding to the frame when such audio data is available. An access unit generally includes all NAL units for one output time instance, e.g., all audio and video data for one time instance. In an example corresponding to H.264/AVC, an access unit may comprise a coded picture in one time instance, which may be presented as a primary coded picture. Accordingly, an access unit may comprise all video frames of a common temporal instance, e.g., all view components corresponding to time X.

Encapsulation unit 30 may assemble NAL units into tracks of a video file conforming to ISO base media file format or a derivative thereof (e.g., SVC, AVC, MVC, or 3GPP), and pass the video file to output interface 32. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the NAL unit or access unit to a computer-readable medium (e.g., channel 34), for example, a transient medium such as a transmission signal or carrier wave, or a computer-readable storage medium such as a magnetic medium, an optical medium, a memory, or a flash drive.

Input interface 36 retrieves the data from computer-readable medium (e.g., channel 34). Input interface 36 may comprise, for example, an optical drive, a magnetic media drive, a USB port, a receiver, a transceiver, or other computer-readable medium interface. Input interface 36 may provide the NAL unit or access unit to decapsulation unit 38. Decapsulation unit 38 may demultiplex a transport stream or program stream into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Decapsulation unit 38 may initially select one of the tracks included in a received video file, and then pass only data of the selected track and data of other tracks referenced by extractors of the selected track to video decoder 48, discarding data of other tracks not referenced by an extractor of the selected track. Audio decoder 46 decodes encoded audio data and sends the decoded audio data to audio output 42, while video decoder 48 decodes encoded video data and sends the decoded video data, which may include a plurality of views of a stream, to video output 44. Video output 44 may comprise a display that uses a plurality of views of a scene, e.g., a stereoscopic or autostereoscopic display that presents each view of a scene simultaneously.

As with most video coding standards, H.264/AVC defines the syntax, semantics, and decoding process for error-free bitstreams, any of which conform to a certain profile or level. H.264/AVC does not specify the encoder, but the encoder is tasked with guaranteeing that the generated bitstreams are standard-compliant for a decoder. In the context of video coding standard, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and macroblock (MB) processing rate.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC and is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define, for example, limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

Parameter sets generally contain sequence-layer header information in sequence parameter sets (SPS) and the infrequently changing picture-layer header information in picture parameter sets (PPS). With parameter sets, this infrequently changing information need not be repeated for each sequence or picture; hence, coding efficiency may be improved. Furthermore, the use of parameter sets may enable out-of-band transmission of header information, avoiding the need for redundant transmissions to achieve error resilience. In out-of-band transmission, parameter set NAL units may be transmitted on a different channel than the other NAL units.

Supplemental Enhancement Information (SEI) messages may contain information that is not necessary for decoding coded picture samples from VCL NAL units. The SEI messages may be contained in non-VCL NAL units as described above. In some examples, SEI messages are a normative part of a standard specification (e.g., H.264) and are not mandatory for implementation of a standard compliant decoder. In some examples, SEI messages may assist in processes related to decoding, display, error resilience, and other purposes. In some examples, SEI messages may be sequence level (e.g., a plurality of consecutive pictures/frames) messages. In other examples, SEI messages may be specific to one or more pictures/frames of video data.

In H.264/AVC and other video standards, there might be Intra coded pictures which are the first picture in the decoding order of an open GOP. An open GOP is a group of pictures in which pictures preceding an initial intra picture in output order may not be correctly decodable. An H.264/AVC decoder may recognize an Intra picture starting an open GOP and start decoding the following pictures. Note that such an Intra picture may be associated with a recovery point SEI. In some examples, a frame starting an open GOP is herein referred to as an open decoding refresh (ODR) frame. A closed GOP is such a group of pictures in which all pictures can be correctly decoded. In H.264/AVC, a closed GOP may start from an IDR access unit.

Figure 2:
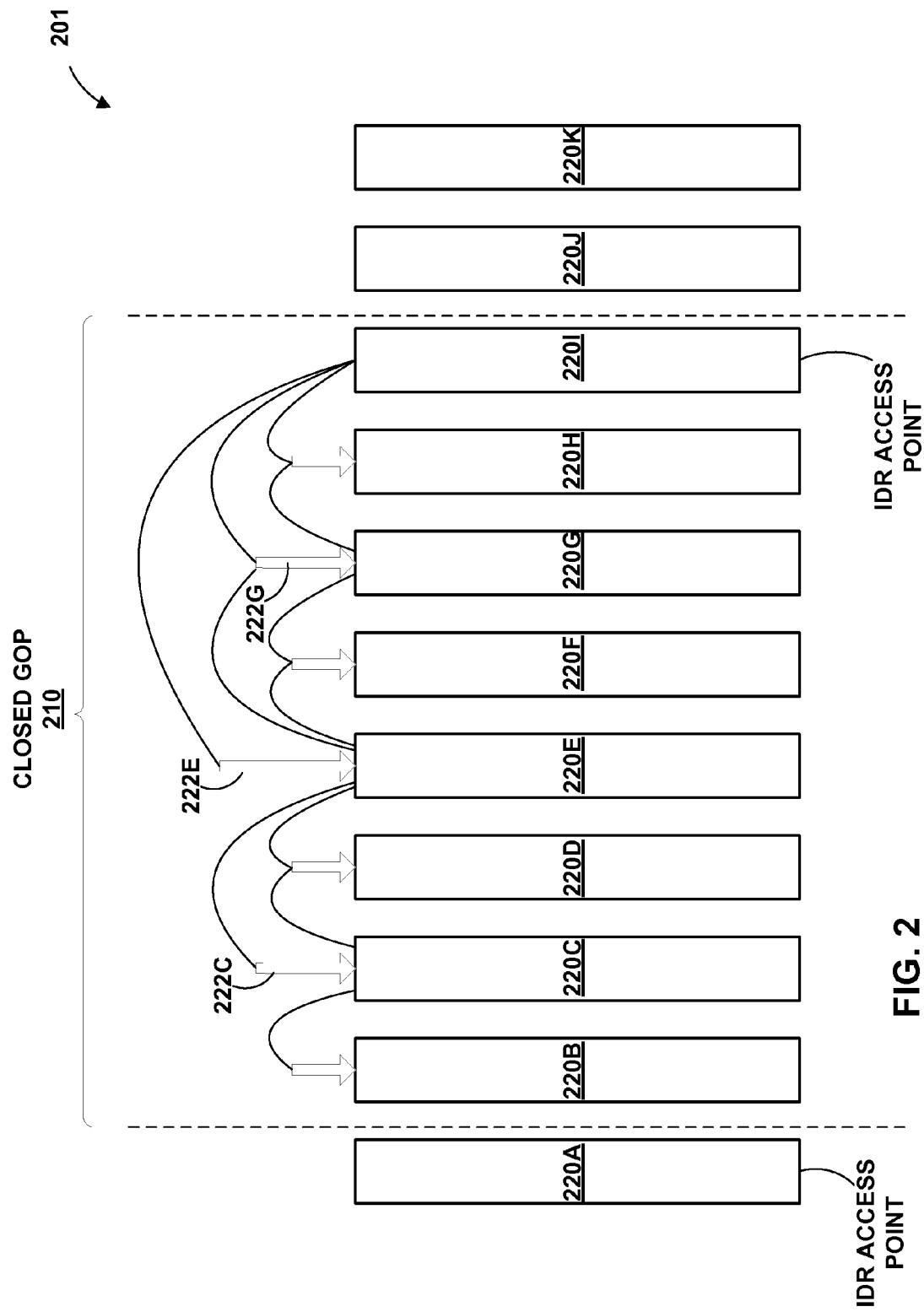
FIG. 2 is a conceptual diagram illustrating one example of a video fragment consistent with the techniques of this disclosure.

FIG. 2 is a conceptual diagram that illustrates one example of video fragment 201 that includes a group of pictures (GOP) 210. A GOP may be described as a grouping of sequential (in presentation order) frames of a video sequence. A video fragment may include any number of GOPs similar to GOP 210.

The example of FIG. 2 depicts a portion of a video fragment 201. The video fragment includes a plurality of frames 220A-220K. Fragment 201 may comprise one or more groups of pictures (GOPs), such as GOP 210. The one or more GOPs 210 may be described as a grouping of frames of a video representation.

GOP 210 illustrated in FIG. 210 is an example of a closed GOP. That is, each of frames 220B-220I can be decoded without reference to frames external to GOP 210, e.g., frames 220A, 220J, and 220K. As shown in FIG. 2, frame 220A precedes (in presentation order) the frames 220B-220I of GOP 210. Frames 220J-220K are subsequent to (in presentation order) frames 220B-220I of GOP 210. Frames 220A and 220J-220K may be part of another GOP of fragment 201.

A presentation order of frames 220A-220K may be different than a decoding order of the frames. For example, a GOP may include any combination of I, B, or P-frames. Intra-coded frames (I-frames) are those frames that are independently decodable, meaning that to decode an I-frame, a decoder need not rely on content of other frames. In the example of FIG. 2, frames 220A and 220I are examples of I-frames. P-frames may be inter-coded relative to one or more frames in one direction. In the example of FIG. 2, frames 220B, 220C, and 220E are examples of P-frames. B-frames may be inter-coded relative to one or more frames in two directions. In the example of FIG. 2, frames 220D, 220F, 220G, and 220H are examples of B-frames.

As discussed above, according to the example of FIG. 2, a decoding order of frames 220A-220K may be different than a presentation order of the frames. For example, when decoding frames 220B-220I, frame 220I (an I-frame) may be decoded first. As indicated by the arrow 222E, frame 220E relies on content of frame 220I to be correctly decoded. As such, frame 220E may be decoded after frame 220I is decoded.

As indicated by arrow 222C, frame 220C may rely on content of frame 220E to be correctly decoded. As indicated by arrow 222G, frame 220G may rely on content of both frames 220E and frame 220I to be correctly decoded. As such, in some examples, decoding of frames 220C and 220G may occur after decoding of frames 220I and 220E. Frames 220B, 220D, 220F, and 220H each rely on content of one or more of frames 220C, 220E, 220G, and 220I, respectively, and therefore may be decoded after frames 220C, 220E, 220G, and 220I have been decoded.

As described above, an instantaneous decoding refresh (IDR) access point may be described as an access point of a closed GOP, e.g., GOP 210 in FIG. 2. A GOP including only frames that are correctly decodable without relying on content of frames outside of the GOP may be considered a closed GOP 210.

FIG. 2 depicts two examples of IDR access points. As shown in the FIG. 2 example, frame 220A does not rely on the content of any other frame to be correctly decodable, i.e., frame 220A does not include any arrow indicating reliance on another frame. Frame 220A may be considered a GOP in and of itself, because there are no frames preceding frame 220A. As such, frame 220A may be considered an IDR access point, because frame 220A is an access point of a GOP that does not rely on the content of any frames outside the GOP (consisting only of frame 220A) to be correctly decoded.

Frame 220I may also be considered an IDR access point of closed GOP 210. As shown in the FIG. 2 example, frame 220I is an I-frame that is independently decodable without relying on the content of any other frame (e.g., frames 220B-220H) of GOP 210. Although each of frames 220B-220H rely on the content of other frames within GOP 210 to be correctly decoded as described above, none of frames 220B-220H rely on the content of any frames outside of GOP 210. As such, GOP 210 may be considered a closed GOP that includes an IDR access point, namely frame 220I.

Figure 3:
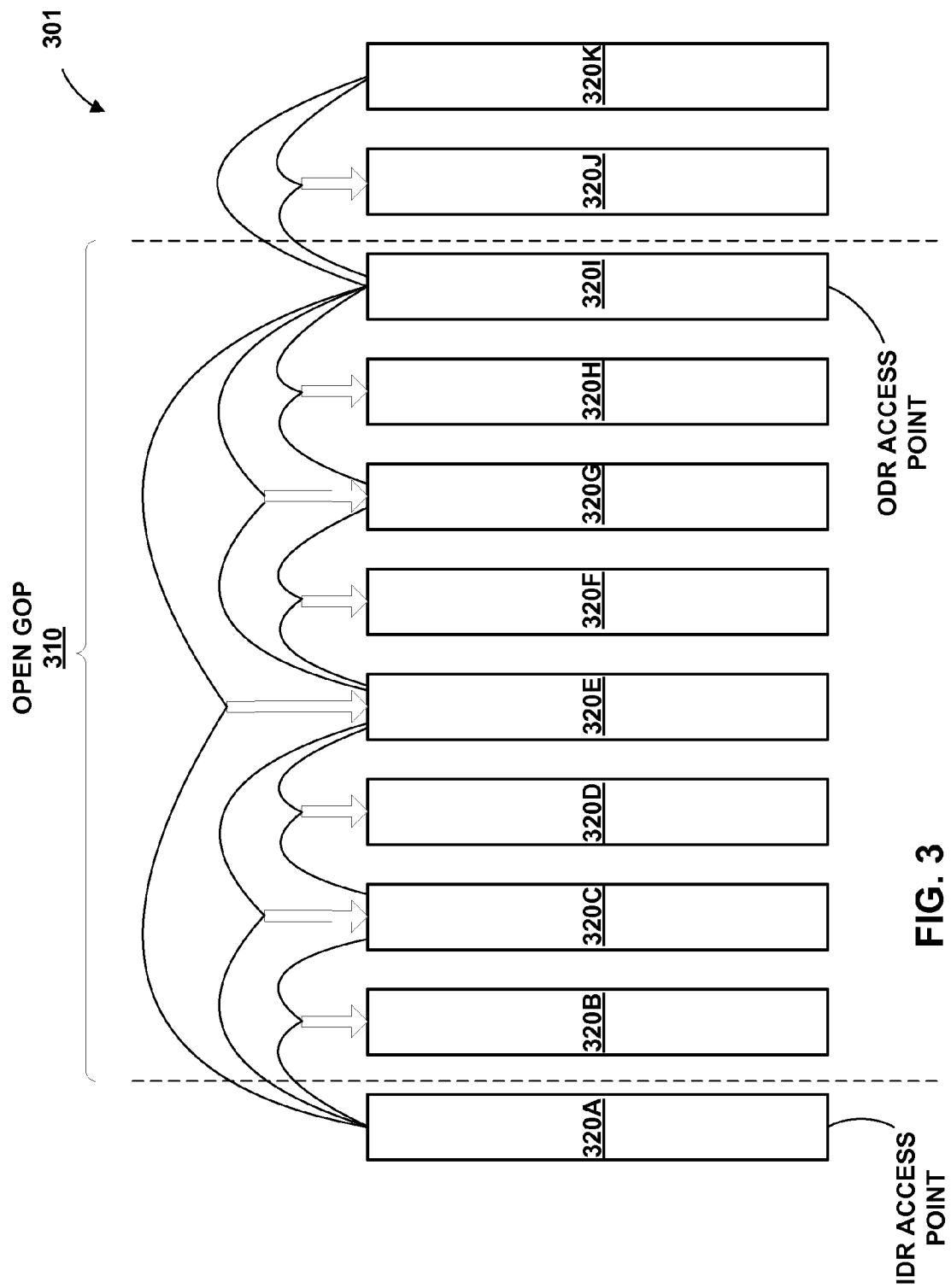
FIG. 3 is a conceptual diagram illustrating one example of a video fragment consistent with the techniques of this disclosure.

FIG. 3 is a conceptual diagram that illustrates one example of at least a portion of a video fragment 301 that includes an open GOP 310 that includes an open decoding refresh (ODR) access point. Similar to the example of FIG. 2, frame 320A is an I-frame and an IDR access point. Also similar to the example of FIG. 2, frame 320I is an I-frame corresponding to a random access point. However, the FIG. 3 example differs from the FIG. 2 example, in that frames of GOP 310 prior to I-frame 320I in display order rely on the content of frame 320A in order to be correctly decodable. For example, as indicated by directional arrows, each of frames 320B, 320C, and 320E directly rely on content of frame 320A. Frames 320D, and 320E-320H each rely indirectly on the content of frame 320A, as each rely at least in part on the content of one or more of frames 320B, 320C, and 320E to be correctly decoded. However, as also depicted in FIG. 3, frames 320J and 320K, which follow I-frame 320I in display order, may be correctly decoded without reliance on any frames prior to I-frame 320I. Thus, I-frame 320I may be used as an ODR RAP.

This disclosure is directed to techniques for improvement of random access functionality in the context of streaming video. The techniques of this disclosure provide for the signaling of ODR access points, and various other information, for commencement of HTTP streaming, decoding, and/or playback of a video presentation.

For example, a client device may receive, from a server device, an indication of an ODR access point of a first GOP of a video representation. Encoding information for at least one frame of the first GOP indicates that at least one frame of the media segmentation following the ODR RAP frame in decoding order may not be correctly decoded. Each frame of the media segmentation following the ODR RAP frame in display order can be correctly decoded without relying on content of frames prior to the ODR RAP in display order. The client device may send, to the server device, a request (e.g., a GET or partial GET request) to retrieve a stream of media data starting with the indicated ODR RAP. The client device may then commence decoding/playback of the media data at the ODR RAP.

In particular, the source device may signal a byte offset to an ODR RAP of a video fragment. The video fragment may be independently addressable using a uniform resource locator (URL) or uniform resource name (URN) specific to the video fragment. By signaling the byte offset to the ODR RAP in the video fragment, the client device may construct a partial GET request comprising a byte range starting at the ODR RAP and ending at the end of the video fragment, in one example.

As another example, a server device may receive a sequence of encoded video frames. A segmentation file of the sequence of encoded video frames includes at least one ODR RAP. At least one frame of the media segmentation following the ODR RAP frame in decoding order may not be correctly decoded. Each frame of the media segmentation following the ODR RAP frame in display order can be correctly decoded without relying on content of frames prior to the ODR RAP in display order. The server device may generate an indication of a location of the ODR RAP. The server device may output the at least one indication to a client device (e.g., in header information for a video file, presentation, or fragment of a video presentation). The client may, based on the at least one indication, request streaming of a segment or a portion of a segment of a video presentation based on the at least one indication.

As another example, a client device may receive at least one indication of a byte range for at least one I-frame of a video fragment or presentation. The client device may, based on the indication, send a request to the server device to retrieve the I-frame. The client device may use the at least one retrieved I-frame to present a high speed version of a video presentation or fragment that includes the I-frame. The I-frame may or may not be an IDR or ODR access point as described above. The high speed version of the video presentation may be presented in response to the client receiving a user request for a fast forward or rewind operation.

Figure 4:
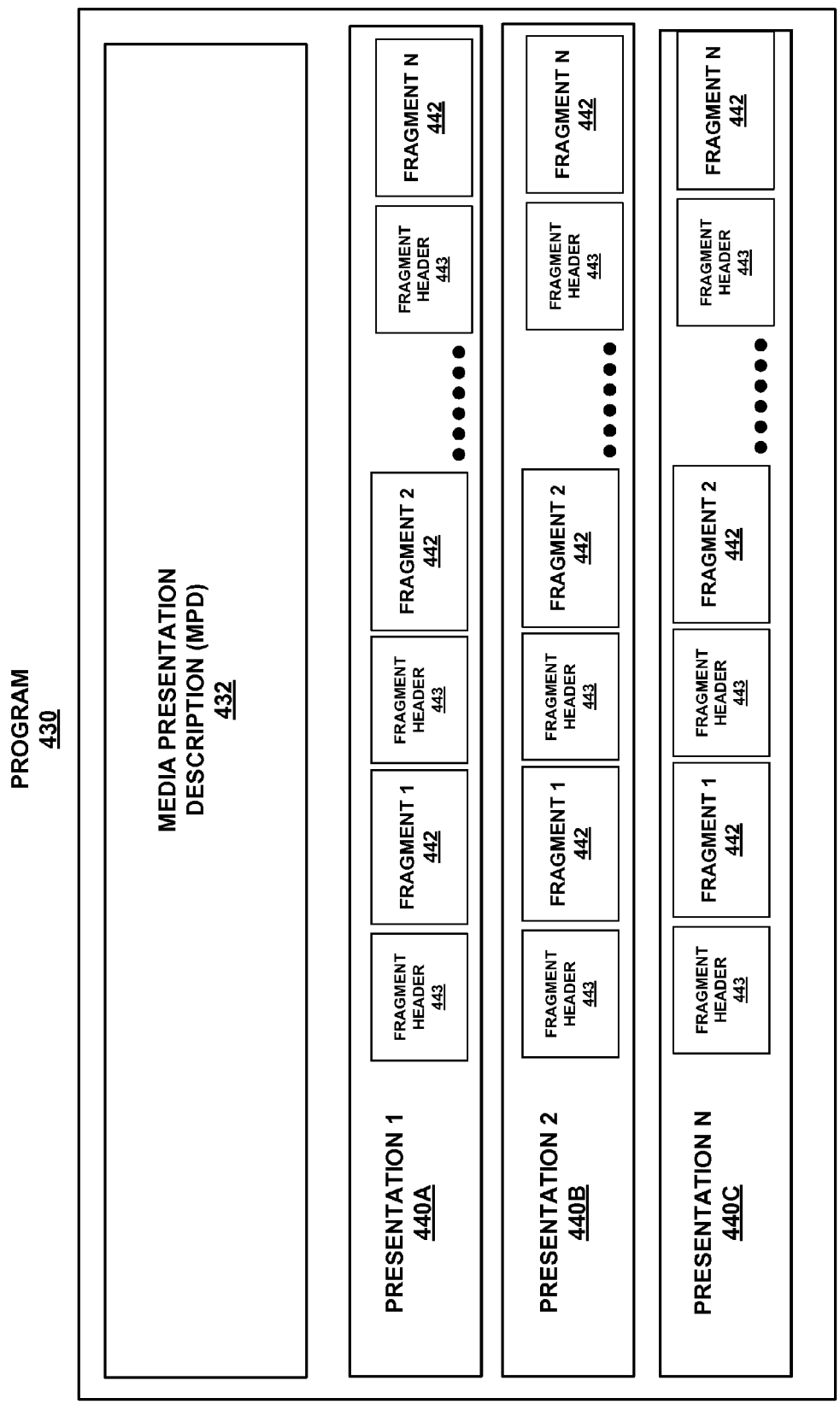
FIG. 4 is a block diagram illustrating one example of a segmentation file consistent with the techniques of this disclosure.

FIG. 4 is a block diagram that illustrates one example of a program 430. Program 430 may be a digital representation of a video (e.g., a movie, television show, or other moving picture presentation). Program 430 may be stored on or accessible by one or more computing devices configured to operate as a server for HTTP streaming. According to the example of FIG. 4, program 430 includes a plurality of representations 440A-440C and a media presentation description (MPD) 432. The plurality of representations 440A-440C may include a plurality of movie fragments 442. The plurality of fragments 442 may be arranged in playback order and represent various temporal (i.e., in time) portions of a video.

Although not depicted in FIG. 4, one or more fragments 442 of a movie representation 440A-440C may be arranged into one or more movie segments. A segment may include a set of continuous movie fragments which may be requested according to a single URL. For example, a segment may be a small file, which may contain video and audio. As another example, a segment may correspond to one movie fragment, which may themselves contain a single video track fragment and a single audio track fragment. As still another example, a segment may correspond to several movie fragments, any of which may have one video fragment and one audio fragment, and the movie fragments may be continuous in decoding time. Although not depicted in FIG. 4, the techniques for signaling information for the representation of video playback according to HTTP streaming may be applicable to any header information for a media program, such as, for example, header information for a segmentation file, e.g., a movie representation, a movie segment, a movie fragment.

MPD 432 may be considered header information for program 430. MPD 432 may include information that describes one or more representations 440A-440C. A client device may retrieve MPD 432 in order to select all or a portion of one or more of representations 440A-440C for streaming playback. A representation 440 may also include fragment headers 443. Fragments headers 443 may include information specific to a particular fragment 442 of representations 440A-440C. Like MPD 432, fragment header 443 may be accessible by an HTTP client device, e.g., for selection of one or more fragments 442 of one or more representations 440A-440C.

A fragment 442 of a representation may or may not include an IDR or ODR access point. For some representations, a fragment 442 may only include a single IDR access point. One or more IDR access points may be signaled in header information for the program 430 (e.g., MPD 432 of FIG. 4) or in header information 443 for one or more fragments 442 of a program 430. One aspect of this disclosure is directed to signaling, in one or more of an MPD 432, a fragment header 443 or other header information of a program 430, ODR access points. Accordingly, an HTTP client may be provided with an increased number of temporal options for commencing streaming, decoding, and/or playback of a program 430.

In some examples, a movie may be two hours or longer. A program 430 or representation representing the movie may include a plurality of temporally arranged (in playback time order) movie fragments that may represent relatively short portions of the full presentation. For example, each movie fragment may represent several seconds or be several minutes long. According to HTTP streaming, a client device may request playback of a segmentation file at a specific point in time of the movie. To do so, the client device may submit a GET or partial GET request to a server that provides the representation. An HTTP GET request may be directed to a particular URL or URN, in order to retrieve an entire file associated with the URL or URN. An HTTP partial GET is also directed to a URL or URN, but further specifies a byte range of the file to retrieve.

In accordance with the techniques of this disclosure, some fragments 442 of movie representations 440 may include header information that signals whether a particular fragment includes an IDR access point. In some cases, if a movie fragment only includes an IDR as a first frame of a movie fragment, a client device may be bound to commencing playback at the beginning, or other specific temporal location, of a video fragment. Some movie fragments may not include an IDR access point and only include one or more ODR access points. In some examples, a client device may not be capable of commencing playback at any point in the video fragment.

A video fragment may represent several seconds, or even minutes, of video data. Therefore, a client may be provided with limited options for the commencement of playback if only IDR access points were signaled. For example, a user may be required to view already-viewed portions of a video presentation to return to a particular point in time of the presentation, e.g., if the user stops playback and then requests to resume playback from a particular temporal location during a subsequent viewing. As another example, a client device may need to download more frames of a video presentation than are needed for decoding/playback starting at a temporal location requested by the user, or a temporal location initiation by the client device (e.g., where the client device has requested an alternate representation of a program, such as where bandwidth conditions have changed). Furthermore, some video fragments may not include an IDR access point.

By signaling ODR access points in header information for a segmentation file, video representation, or video fragment, scan and seek functionality for HTTP video streaming may be improved. For example, where known techniques for HTTP streaming may only provide for streaming/decoding/playback commencement at a small number of fragments and/or positions within fragments, the techniques of this disclosure may provide for an increased number of random access points for playback. The techniques of this disclosure may also be useful for video representations that include a large amount of inter-GOP dependence for decoding.

Other aspects of this disclosure provide for the signaling of a byte range of I-frames of a segmentation file or presentation for purposes of high speed playback (e.g., fast forward, rewind) of a movie representation. According to these aspects, a byte range of one or more I-frames of a movie presentation may be signaled to a client device, such that the client device may request, receive, and/or decode I-frames of the movie representation for purposes of displaying the video representation at high speed, e.g., by displaying only the I-frames or a subset of the available I-frames of the video representation.

The techniques of this disclosure may be applied to video files conforming to any of ISO base media file format, Scalable Video Coding (SVC) file format, Advanced Video Coding (AVC) file format, Third Generation Partnership Project (3GPP) file format, and/or Multiview Video Coding (MVC) file format. The ISO Base Media File Format is designed to contain timed media information for a representation in a flexible, extensible format that facilitates interchange, management, editing, and presentation of the media. ISO Base Media File format (ISO/IEC 14496-12: 2004) is specified in MPEG-4 Part-12, which defines a general structure for time-based media files. It is used as the basis for other file formats in the family such as AVC file format (ISO/IEC 14496-15) defined support for H.264/MPEG-4 AVC video compression, 3GPP file format, SVC file format, and MVC file format. 3GPP file format and MVC file format are extensions of the AVC file format. ISO base media file format contains the timing, structure, and media information for timed sequences of media data, such as audio-visual representations. The file structure is object-oriented. A file can be decomposed into basic objects very simply and the structure of the objects is implied from their type.

Files conforming to the ISO base media file format are formed as a series of objects, called "boxes." Data in the ISO base media file format is contained in boxes and there is no other data within the file. This includes any initial signature required by the specific file format. The "box" is an object-oriented building block defined by a unique type identifier and length. Typically, a presentation is contained in one file, and the media presentation is self-contained. The movie container (movie box) contains the metadata of the media and the video and audio frames are contained in the media data container and could be in other files.

A presentation (motion sequence) may be contained in several files. Timing and framing (position and size) information may be included in a file conforming to the ISO base media file format, while ancillary files may essentially use any format. This presentation may be 'local' to the system containing the presentation, or may be via a network or other stream delivery mechanism.

The files may have a logical structure, a time structure, and a physical structure, and these structures are not required to be coupled. The logical structure of the file may be of a movie that in turn contains a set of time-parallel tracks. The time structure of the file may be that the tracks contain sequences of samples in time, and those sequences are mapped into the timeline of the overall movie by optional edit lists. The physical structure of the file may separate the data needed for logical, time, and structural de-composition, from the media data samples themselves. This structural information may be concentrated in a movie box, possibly extended in time by movie fragment boxes. The movie box may document the logical and timing relationships of the samples, and may also contain pointers to where they are located. Those pointers may be into the same file or another one, e.g., referenced by a URL.

Each media stream may be contained in a track specialized for that media type (audio, video etc.), and may further be parameterized by a sample entry. The sample entry may contain the 'name' of the exact media type (the type of decoder needed to decode the stream) and any parameterization of that decoder needed. The name may also take the form of a four-character code, e.g., "moov," or "trak." There are defined sample entry formats not only for MPEG-4 media, but also for the media types used by other organizations using this file format family.

Support for meta-data generally takes two forms. First, timed meta-data may be stored in an appropriate track, synchronized as desired with the media data it is describing. Secondly, there may be general support for non-timed meta-data attached to the movie or to an individual track. The structural support is general, and allows, as in the media-data, the storage of meta-data resources elsewhere in the file or in another file. In addition, these resources may be named, and may be protected.

As discussed above, one example of an ISO base media file format extension is the AVC file formation. A segmentation file created according to the AVC file format may include NAL units that are parameter sets, including sequence parameter sets (SPS) and picture parameter sets (PPS). Parameter sets may be associated with an elementary stream of a video, which may be included in one or more video tracks. In some examples, a parameter set may be in another track (a parameter set track) than an elementary stream of a video. The parameter set track may be a parameter set elementary stream that contains samples that are SPS and/or PPS NAL units. SPS and PPS NAL units may include one or more SEI messages that include information not necessary for decoding coded picture samples from VCL NAL units. A location of NAL units that include SEI messages is not restricted, as long as any SEI message presents in a sample with a decoding time prior to any picture that uses the SEI message.

As also discussed above, other examples of ISO file format extensions include SVC and MVC file formats. SVC and MVC may also be considered extensions of the AVC file format described above. According to the SVC and MVC formats, multiple layers/views of a video may be contained in a single video track or multiple video tracks. The SVC and MVC file format specifications may provide for tools that enable the construction of operation points when layers/views are presented in various organizations.

Progressive download is a term used to describe the transfer of digital media segmentations from a server to a client, typically using the HTTP protocol. When initiated from a computer, the consumer may begin playback of the media before the download is complete. A difference between streaming media and progressive download is in how the digital media data is received and stored by the end user device that is accessing the digital media. A media player that is capable of progressive download playback relies on metadata located in the header of the file to be intact and a local buffer of the digital media segmentation as it is downloaded from a web server. At the point in which a specified amount of data becomes available to the local playback device, the media will begin to play. This specified amount of buffer may be embedded into the file by the producer of the content in the encoder settings and may be reinforced by additional buffer settings imposed by the media player.

Using HTTP for video streaming has some advantages, and video streaming services based on HTTP are becoming popular. Some advantages of HTTP streaming include that existing Internet components and protocols may be used, such that new efforts are not needed to develop new techniques for transporting video data over a network. Other transport protocols, e.g., RTP payload format, require intermediate network devices, e.g., middle boxes, to be aware of the media format and the signaling context. Also, HTTP streaming can be client-driven, which avoids many control issues. For example, to exploit all features to obtain optimal performance, the server may keep track of the size and content of packets which are not yet acknowledged. The server may also analyze the file structure and reconstruct the state of the client buffer to make RD-optimal switching/thinning decisions. In addition, constraints on the bit stream variations may be satisfied in order to stay compliant with negotiated profiles. HTTP may not require new hardware or software implementations at a Web server that has HTTP 1.1 implemented. HTTP streaming may also provide TCP-friendliness and firewall traversal. The techniques of this disclosure may improve HTTP streaming of video data to overcome issues related to bandwidth, e.g., by providing bitrate adaptation.

Video compression standards such as ITU-T H.261, H.262, H.263, MPEG-1, MPEG-2 and H.264/MPEG-4 part 10 make use of motion compensated temporal prediction to reduce temporal redundancy. The encoder uses a motion compensated prediction from some previously encoded pictures (also referred to herein as frames) to predict the current coded pictures according to motion vectors. There are three major picture types in typical video coding. They are Intra coded picture ("I-pictures" or "I-frames"), Predicted pictures ("P-pictures" or "P-frames") and Bidirectional predicted pictures ("B-pictures" or "B-frames"). Blocks of P-pictures may be intra-coded or predicted with reference to one other picture. In a B-picture, blocks may be predicted from one or two reference pictures, or may be intra-coded. These reference pictures could be located before or after the current picture in temporal order.

3GPP file format (3GPP) is another example of an extension to the ISO media base file format. 3GPP is a multimedia container format defined by the Third Generation Partnership Project (3GPP) for 3G UMTS multimedia services. It is typically used on 3G mobile phones and other 3G capable devices, but can also be played on some 2G and 4G phones and various other devices. 3GPP file format is based on ISO base media file format. The latest 3GP is specified in 3GPP TS26.244, "Transparent end-to-end packet switched streaming service (PSS); 3GPP file format (3GP)." The 3GPP file format stores video streams as MPEG-4 Part 2 or H.263 or MPEG-4 Part 10 (AVC/H.264). 3GPP allows use of AMR and H.263 codecs in the ISO base media file format (MPEG-4 Part 12), because 3GPP specifies the usage of the Sample Entry and template fields in the ISO base media file format as well as defining new boxes to which codecs refer. For the storage of MPEG-4 media specific information in 3GP files, the 3GP specification refers to MP4 and the AVC file format, which are also based on the ISO base media file format. The MP4 and the AVC file format specifications describe usage of MPEG-4 content in the ISO base media file format.

The 3GPP file format may support HTTP streaming. In some examples, the 3GPP file format may include a media presentation description MPD (e.g., MPD 432 as illustrated in FIG. 4). The MPD may include descriptions of different alternative representations (e.g., video services with different quality) and the description may include e.g., code, profile and level information. The MPD may not be part of a 3GPP file that includes video data.

Figure 5:
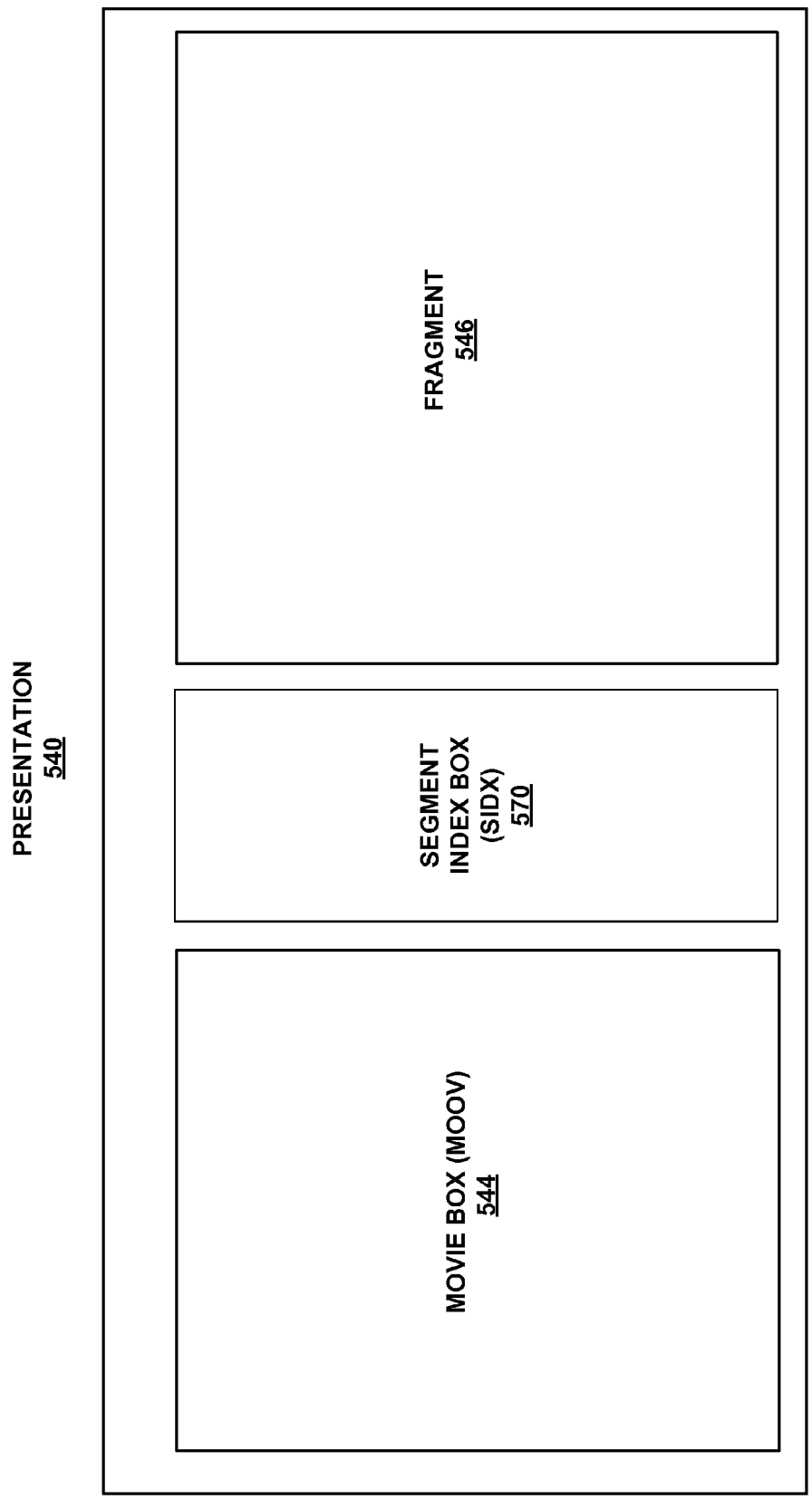
FIG. 5 is a block diagram illustrating one example of a movie presentation consistent with the techniques of this disclosure.

FIG. 5 is a block diagram that depicts one example of a representation 540 for a video program (e.g., one of representations 440A-440C illustrated in FIG. 4 above). The example of FIG. 5 depicts a representation 540 according to the 3GPP file format. The representation 540 of FIG. 5 is provided merely for purposes of explaining the techniques of this disclosure, and is intended to be non-limiting. The techniques of this disclosure may be applied to any digital representation of video data, whether or not explicitly mentioned herein.

As shown in FIG. 5, representation 540 includes a movie box (moov) 544, a segment index box (sidx) 570, and one or more movie fragments (moof) 546. For ease of illustration, only one movie fragment 546 is depicted in the FIG. 5 example. A typical movie representation 540 may include a plurality of movie fragments 546, as depicted in FIG. 4.

Movie box 544 may include various information specific to representation 540. For example, movie box 544 may indicate information such as a desired bit rate for streaming of the movie representation. Movie box 544 may instead or in addition include one or more indications of information specific to fragments 546. For example, movie box 544 may include information indicating a number of fragments 546 contained in representation, a playback time corresponding to a start and or end of one or more fragments 546, and/or one or more indications of bit ranges for fragments 546 of representation 540.

Representation 540 may further include one or more segment index boxes 570. A segment index box 570 may precede one or more fragments 546 of representation 540. In some examples, a segment index box 570 may precede each fragment 546 of representation 540 (see for example FIG. 4). In other examples, a segment index box 570 may precede each segment of a representation, where a plurality of fragments are arranged into a movie segment.

Segment index box 570 may be configured to signal information related to random access functionality for fragments 546. For example, according to known implementations, segment index box 570 may indicate an IDR access point of a fragment 546. Segment index box 570 may further indicate a byte offset (reference offset) of a fragment that includes an IDR access point (a reference fragment). Segment index box 570 may further indicate timing information of a first sample of a reference fragment (reference delta time). Segment index box may further indicate whether a current movie fragment (e.g., a fragment subsequent to segment index box 570) includes a random access point (contains RAP). Segment index box 570 may further indicate a timing different between a first sample of a movie fragment 546 and a first random access point of the movie fragment 546.

The below pseudo code is one example of code that may be used to implement a segment index box 570 according to some techniques. The below pseudo code describes some variables that may be used for a segment index box data structure. These variables generally correspond to similarly named variables described above.

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32)    track_ID;
        if (version==0)
        {
            unsigned int(32)    decode_time;
        } else
        {
            unsigned int(64)    decode_time;
        }
    }
    for(i=1; i <= reference_count; i++)
    {
        bit (1)             reference_type;
        unsigned int(31)    reference_offset;
        unsigned int(32)    reference_delta_time;
        bit(1)              contains_rap;
        unsigned int(31)    RAP_delta_time;
    }
}
```

Some implementations of a segment index box 570 of a movie representation 540 may suffer from various shortcomings. For example, some implementations of a segment index box 570 are only configured to signal IDR access points for a video fragment 546. Furthermore, in some cases a movie fragment 546 may begin with a frame which is an IDR random access point. In these cases, implementations of segment index box 570 do not signal that the first frame is an IDR access point. Instead, timing information of a difference between a first sample of a fragment and a first random access point of the signal (e.g., reference delta time) is still signaled. This may be undesirable, as segment index box 570 may communicate unneeded information in some cases.

Some implementations of a segment index box 570 may further be undesirable because a signal byte offset for an IDR RAP is presented relative to a beginning (first frame) of a movie fragment. As such, in some cases, all of the frames of a fragment 546 may need to be downloaded by a client device, even where an IDR RAP occurs at some time after the first frame of the video fragment 546 although the samples preceding the IDR RAP may not be decoded for playback, thus wasting valuable bandwidth of a network connection.

This disclosure is directed to improved techniques for the signaling of ODR RAP of a video presentation, e.g., of a video fragment of a video representation, and/or other information relevant to scan and/or seek functionality for a video representation. This disclosure is further directed to signaling a byte range of I-frames of a video fragment or video representation. A signaled byte range may be used by a client device to request one or more signaled I-frames in order to provide a high speed version of a video presentation for purposes of fast forward or rewind operations.

For purposes of explanation, the techniques of this disclosure are described as they apply to a segment index box 570 of a video representation according to a 3GPP file format. One of ordinary skill in the art will recognize that the techniques of this disclosure are applicable to any other format for the digital representation of a moving picture for playback. Furthermore, the techniques of this disclosure are described in terms of signaling ODR access points, other information, and/or a byte range of I-frames in header information specific to one or more fragments of a segmentation file. One of ordinary skill in the art will recognize that header information as described herein may signal ODR access points, I-frame byte ranges, or other information at other levels of a segmentation file, such as in an MPD file (segmentation file level) general to an entire movie representation, in header information specific to a particular representation, or in header information specific to a particular segment of a movie representation.

Figure 6:
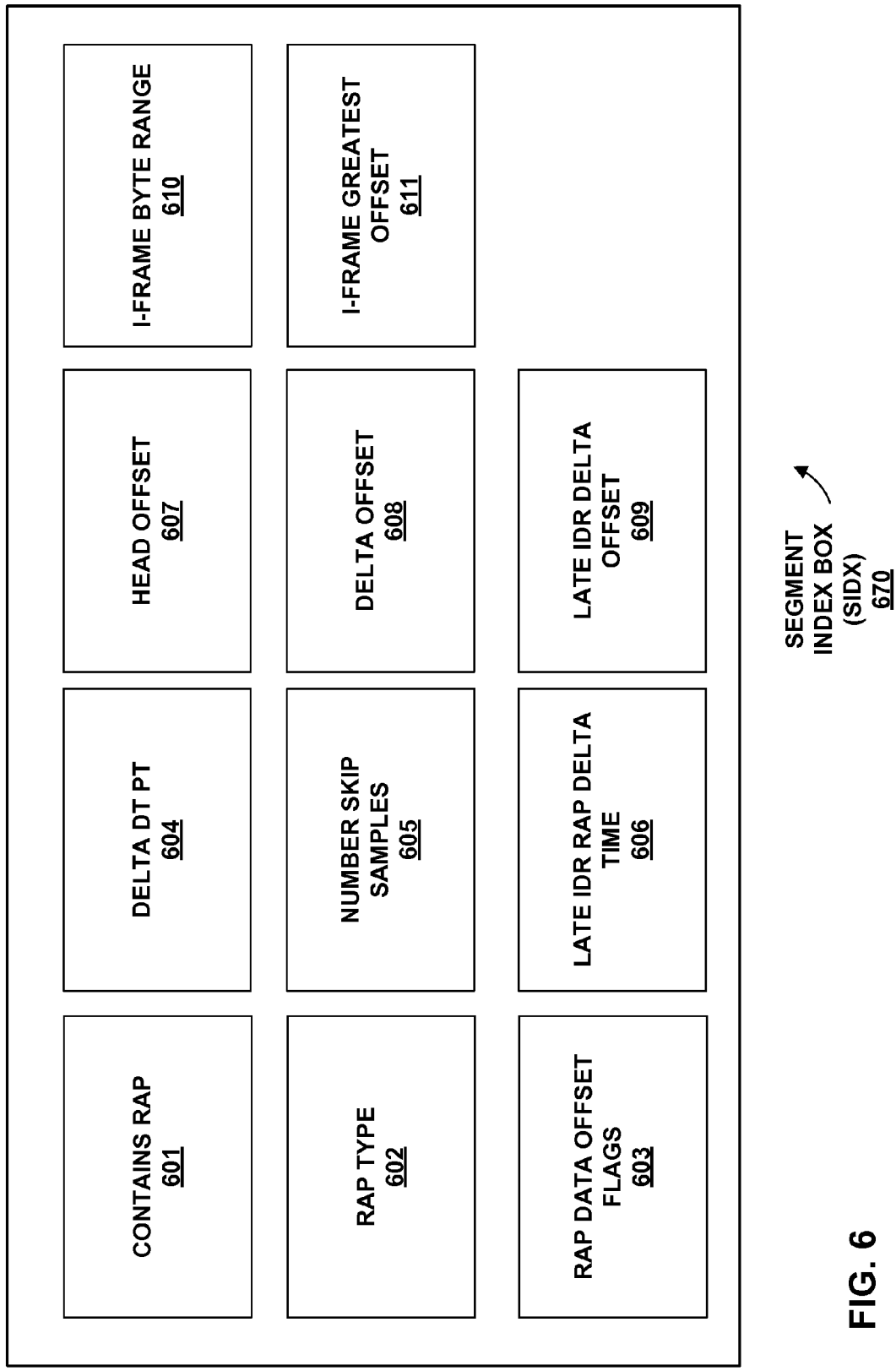
FIG. 6 is a block diagram illustrating one example of a segment index box consistent with the techniques of this disclosure.

FIG. 6 is a block diagram that illustrates various information that may be signaled by a segment index box 670 of a movie presentation (e.g., presentation 540 illustrated in FIG. 5) consistent with the techniques of this disclosure. The segment index box 670 may be a data structure configured to store information relevant to one or more segmentation files. In some examples, segment index box 670 may include a subset of the information illustrated in FIG. 6, or may include all of the information illustrated in FIG. 6. One example of pseudo code that may be utilized to implement a segment index box 670 consistent with the techniques of this disclosure is presented below:

```
aligned(8) class SegmentIndexBox extends FullBox('sidx', version, 0) {
    unsigned int(32) reference_track_ID;
    unsigned int(16) track_count;
    unsigned int(16) reference_count;
    for (i=1; i<= track_count; i++)
    {
        unsigned int(32)    track_ID;
        if (version==0)
        {
            unsigned int(32)    decode_time;
        } else
        {
            unsigned int(64)    decode_time;
        }
    }
    for(i=1; i <= reference_count; i++)
    {
        bit (1)             reference_type;
        int (2)             contain_RAP;
        int (2)             RAP_type;
        bit (2)             RAP_data_offset_flags;
        int (2)             reserved;
        unsigned int(32)    reference_offset;
        unsigned int(32)    reference_delta_time;
        if ( contain_RAP > 1 )
            unsigned int(32)    RAP_delta_time;
        if ( contain_RAP > 0 && RAP_type !=0 )
        {
            unsigned int(32)    delta_DT_PT;
            unsigned int(8)     number_skip_samples;
        }
        if ( contain_RAP > 0 && RAP_type == 3)
            unsigned int(32)    late_IDR_RAP_delta_time;
        if( RAP_data_offset_flags[0] || RAP_data_offset_flags[1] )
        {
            unsigned int(8)             head_offset;
            if (RAP_data_offset_flags[0] && head_offset > 0 )
                unsigned int(32)        delta_offset;
```

-continued

```
        if (RAP_data_offset_flags[1] && head_offset > 0)
            unsigned int(32)       late_IDR_delta_offset;
        }
    }
}
```

The above pseudo code defines a number of variables that may be used to signal information related to the streaming of media in a segment index box data structure of a media segment consistent with the techniques of this disclosure. The above variables generally correspond to similarly-named signaling described below with reference to FIG. 6.

In one example, the value contains_RAP from the pseudocode above may be defined according to the following semantic definition: "contains_RAP: when the reference is to a movie fragment, then this value may be 2 if the track fragment within that movie fragment for the track with ID reference_track_id contains at least one random access point, this value may be 1 if the track fragment within that movie fragment for the track with ID reference_track_id contains the first sample as an random access point; otherwise, this value is set to 0. When the reference is to a segment index, then this value shall be set to 1 or 2 only if any of the references in that segment index have this value set to 1 or 2, and 0 otherwise."

Table 1 below provides an example set of values for contains_RAP and the semantic implications of each value.

TABLE 1

| contains_RAP Value | Semantic Meaning |
|---|---|
| 0 | No random access point contained |
| 1 | Random access point contained as the first sample of the movie fragment or the track fragment |
| 2 | Random access point contained, but not as the first sample |
| 3 | Reserved |

In one example, the value RAP_type from the pseudocode above may be defined according to the following semantic definition: "This value specifies the type of random access points contained in the referenced track of the movie fragment.

Table 2 below provides an example set of values for contains_RAP and the semantic implications of each value.

TABLE 2

| RAP_type Value | Semantic Meaning |
|---|---|
| 00 (0) | IDR is the first random access point contained |
| 01 (1) | ODR is the first random access point contained and IDR may or may not contained after the ODR |
| 10 (2) | ODR is the first random access point contained, but IDR is also contained after the ODR. The first IDR after the ODR is called the late IDR and can be also used as a random access point |
| 11 (3) | Reserved |

In one example, as illustrated in FIG. 6, segment index box 670 includes at least one indication of whether or not a video fragment, includes a random access point, contains RAP 601. Contains RAP 601 may indicate whether a movie fragment includes either of an IDR or ODR access point, or both. Contains RAP 601 may further indicate whether a first sample of a movie fragment is a random access point. Contains RAP 601 may instead signal that a move fragment does not include any random access points.

In one specific example, if a movie fragment includes at least one random access point, contains RAP 601 may be assigned a value of 2. If the movie fragment includes at least one random access point that is the first sample of the fragment, contains RAP 601 may be assigned a value of 1. If the movie fragment does not include any random access point, contains RAP may be assigned a value of 0.

As also illustrated in the example of FIG. 6, segment index box 670 may include at least one indication of a random access point type, RAP type 602. RAP type 602 may indicate whether an IDR access point is the first random access point contained in a video fragment. RAP type 602 may further indicate whether an ODR access point is the first random access point of a video fragment. RAP type 602 may further indicate that an ODR is a first random access point of a video fragment, and that the video fragment also includes an IDR subsequent to the ODR access point. An IDR access point subsequent to an ODR access point may be referred to as a late IDR access point.

In one specific example, RAP type 602 may be assigned a value of 00 (0) if an IDR access point is the first random access point contained in a video fragment. According to this example, RAP type 602 may be assigned a value of 01 (1) if an ODR access point is the first random access point of a video fragment. Also according to this example, RAP type 602 may be assigned a value of 10 (2) if an ODR is a first random access point of a video fragment, and the video fragment also includes an IDR subsequent to the ODR access point.

As also illustrated in the example of FIG. 6, segment index box 670 may include at least one indication of a random access point data offset, RAP data offset flags 603. RAP data offset flags 603 may indicate whether a byte offset of an RAP should be further signaled. For example, RAP data offset flags 603 may indicate when a first random access point of a video fragment is not a first sample of a track of the fragment. In one specific example, RAP data offset flags 603 may be assigned a value of 1 when a first RAP is not the first sample of a referenced track of a movie fragment. According to this example, if a first RAP is a first sample of a referenced track of a movie fragment, RAP data offset flags 603 may be assigned a value of 0. In one example, RAP data offset flags 603 may only be assigned a value of 1 when RAP type 602 is assigned a value of 2 (e.g., the video fragment includes an IDR after a first RAP of the fragment).

As also illustrated in the example of FIG. 6, segment index box 670 may include at least one indication of a difference between a decomposition time (decoding time) and a presentation time of an ODR RAP, delta dt pt 604. In one specific example, delta dt pt may be assigned a numerical value representing a number of minutes, seconds, clock cycles, or other indication of a timing difference between a decomposition time and a presentation time of an ODR RAP.

As also illustrated in the example of FIG. 6, a segment index box 670 may include at least one indication of a number of samples (frames) of a video fragment or presentation with a presentation time prior to and a decomposition (decoding) time after an ODR RAP, number skip samples 605. In one specific example, number skip samples may be assigned a numerical value that represents a number of samples with a presentation time prior to and a decomposition time after an ODR RAP.

As also illustrated in the example of FIG. 6, segment index box 670 may include at least one indication of a decoding time difference between a first IDR RAP and a first sample of a video fragment, late IDR RAP delta time 606. If RAP type 602 is assigned a value of 2, late IDR RAP delta time 606 may be assigned a numerical value that indicates a difference in decoding time (e.g., a number of frames, byte range, number of clock cycles, or other indication of a decoding time difference) between a first IDR RAP and a first sample of a video fragment.

As also illustrated in the example of FIG. 6, a segment index box 670 may include at least one indication of an offset of a first byte of a movie fragment and a first byte of a first sample of the movie fragment, head offset 607. Head offset 607 may indicate a byte length of header information of a video fragment. In one specific example, head offset 607 may be assigned a numerical value that indicates a byte offset between a first byte of a video fragment and a first frame of the video fragment, for example a number of bytes of a header or a byte range of the header. In one example, head offset 607 may be assigned a value of 0 if a movie fragment includes more than one track.

As also illustrated in the example of FIG. 6, a segment index box 670 may include at least one indication of a byte offset between a first byte of a random access point and first byte of a movie fragment, delta offset 608. In one specific example, delta offset 607 may be assigned a numerical value that indicates a byte offset between a first byte of a random access point and first byte of a movie fragment, for example a number of bytes or a byte range between a first byte of a random access point and a first byte of a movie fragment.

As also illustrated in the example of FIG. 6, a segment index box 670 may include at least one indication of a byte offset between a first byte of a late IDR RAP and a first byte of a movie fragment, late IDR delta offset 609. In one specific example, late IDR delta offset 609 may be assigned a numerical value that indicate a number of bytes between, or a byte range, that indicates a difference between a first byte of a late IDR RAP and a first byte of a movie fragment.

The implementation of head offset 607, delta offset 608, and/or late IDR delta offset 609 as shown in FIG. 6 may be advantageous, because less bits (e.g., 8 bits) may be used to signal a head offset (e.g., number of bytes of header information of a movie fragment or presentation). According to prior techniques, 32 bits may be used to signal a head offset for a video fragment, in order to account for cases where there is additional information (e.g., boxes) in a movie fragment and/or where a movie fragment includes multiple tracks.

As also illustrated in the example of FIG. 6, a segment index box 670 may further or instead include at least one indication of a byte range for one or more I-frames of a fragment, I-frame byte range 610. I-frame byte range 610 may indicate a byte range of I-frames to a client device such that the client device may selectively request, receive, and/or decode I-frames to provide a high speed version (e.g., fast forward, fast rewind) of a video presentation. In some examples, a client device may request, receive, and/or decode only indicated I-frames of the or fragment. According to this example, a client device may present a high speed version of a video presentation, without requesting, receiving, and/or decoding all the frames (e.g., P-frames or B-frames) of a video fragment, thereby reducing an amount of data transferred to present a high speed version of the video fragment.

As also illustrated in the example of FIG. 6, a segment index box 670 may further or instead include at least one indication of a greatest offset for I-frames of a video fragment, I-frame greatest offset 611. I-frame greatest offset 611 may describe, for one or more fragments of a video representation, a byte range of the fragment for which the fragment likely includes at least one I-frame. In one example, a client device may receive I-frame greatest offset 611 and request only the portion of a video fragment indicated by I-frame greatest offset 611. According to this example, the client device may receive frames of the requested byte range, and decode at least the I-frames of the requested byte range to provide a high speed version (e.g., fast forward, fast rewind) of a video representation that includes the fragment.

The various information included in a segment index box 670 as described with respect to FIG. 6 may be utilized by an HTTP client device to acquire media for purposes of streaming playback. For example, an HTTP server device may make one or more segment index box 670 for farm of a movie presentation available to a client device for access. The client device may review the information of segment index box 670, and use that information to determine a request for streaming of media. For example, a client device may determine, based on the information of segment index box 670, at what temporal locations (e.g., access point(s)) in a video presentation streaming/decoding/playback may commence. In response to determining one or more access points, the client device may initiate a GET or Partial GET request for streaming of data. The GET or partial GET request may case a fragment, or a portion of a fragment, to be transmitted by the server device to the client device for decoding/playback.

The techniques of this disclosure may provide for improved granularity for commencement of streaming, decoding, and/or playback of a moving picture presentation. For example, by signaling an identification of one or more ODR access points for a video fragment, a client device may access more commencement points in a representation than prior techniques that only allowed for the signaling of IDR access points and/or the frame level signaling (e.g., via picture level SEI messages as described above). Frame level signaling of ODR access points may be disadvantageous, because a client device may be required to acquire and decode an entire fragment of a video presentation in order to determine a location of an ODR access point. As such, the techniques of this disclosure allow for improved granularity for selection of an access point for streaming video applications, without the unnecessary transfer and/or decoding of video presentation frames.

In addition, the techniques of this disclosure may enable client devices of different complexity to choose an IDR or ODR access point in a video fragment that includes both IDR and ODR access points. For example, the RAP type field 602 of a segment index box 670 may indicate to a client device if a fragment contains both IDR and ODR access points. If a client device is configured to receive/decode/playback starting at an ODR access point, the client device may choose the ODR access point for commencement of decoding/playback. However, if the client device is only configured to commence decoding/playback from an IDR access point, the client device may skip the ODR access point and commence at the IDR access point.

The various techniques of this disclosure may further allow for a reduction in the transmission of unnecessary data for decoding and/or playback. For example, by signaling a timing difference between a presentation time and composition time of an ODR picture (e.g., via delta dt pt 604 in the example of FIG. 6), streaming and/or decoding of samples prior to the ODR picture may be skipped. As such, a client device need not receive/decode these samples, thus reducing an amount of bandwidth and/or processing power consumed to playback a video presentation.

As another example, by signaling a byte offset of various aspects of a movie fragment (e.g., head offset 607, delta offset 608, and/or late IDR delta offset 609) may allow for the transmission of data corresponding to samples prior to a random access point, or other data not needed for decoding, to be skipped.

As another example, by signaling a byte range for I-frames of a video fragment, (e.g., I-frame byte range 610, I-frame greatest offset 611), a client device may request only those frames desirable to provide a high speed version of a video presentation. This technique may be beneficial in comparison to other techniques for providing high speed version of a video representation, because a specific representation need not be created for purposes of high speed playback (e.g., fast forward, fast rewind) of a video presentation. Instead, frames of an existing presentation may be used to provide a high speed representation. Furthermore, an amount of data needed to provide a high speed version of a video representation (e.g., transmitted, received, decoded) may be reduced.

Another example of pseudo code that may be utilized to implement a segment index box configured to signal information relating to random access points consistent with the techniques of this disclosure is presented below:

```
aligned(8) class SegmentIndexBox extends FullBox('sidx', version, 0) {
    unsigned int(32) reference_track_ID;
    unsigned int(16) track_count;
    unsigned int(16) reference_count;
    for(i=1; i <= reference_count; i++)
    {
        bit(1)              contains_RAP;
        bit(1)              RAP_first_sample;
        unsigned int(1)     RAP_type;
        unsigned int(2)     RAP_data_offset_flags;
        int (3)             reserved;
        if ( contains_RAP && !RAP_first_sample )
            unsigned int(32) RAP_delta_time;
        if ( RAP_type )
        {
            unsigned int(32) delta_PT;
            unsigned int(8)  number_skip_samples;
        }
    }
}
```

According to the above pseudo code example, RAP_first_sample may indicate whether a first sample of a media segmentation is an RAP. For example, RAP_first_sample may have a value of 1 to the first sample of the reference entry is a RAP. RAP_first_sample may have a value of 0 to indicate that the first sample of the reference is not a RAP. RAP_type may indicate a type of RAP contained in a media segmentation. For example, RAP_type may have a value of 0 to indicate that media segmentation contains an IDR RAP. RAP_type may have a value of 1 to indicate that a media segmentation contains an ODR RAP. Delta_PT may indicate a time difference between a presentation (composition) time and a decoding time of a first sample after an ODR RAP, in presentation order. Number_skip_samples may indicate a number of samples with a presentation time prior to and a decomposition time after an ODR RAP, which may be a first RAP of a media segmentation.

In another example not illustrated in FIG. 6, an MPD file of a movie representation may be configured to signal information relating to ODR and/or IDR RAP. For example, an MPD may include a syntax element RAPAsODR, which may comprise a binary flag value. The RAPAsODR value may be set to indicate whether or not some random access points are ODRs. That is, in some examples, the RAPAsODR value may be set to a value of "true" to indicate that at least one random access point in the video sequence corresponding to the MPD is an ODR frame, but may be set to a value of "false" to indicate that all random access points are IDR frames.

Figure 7:
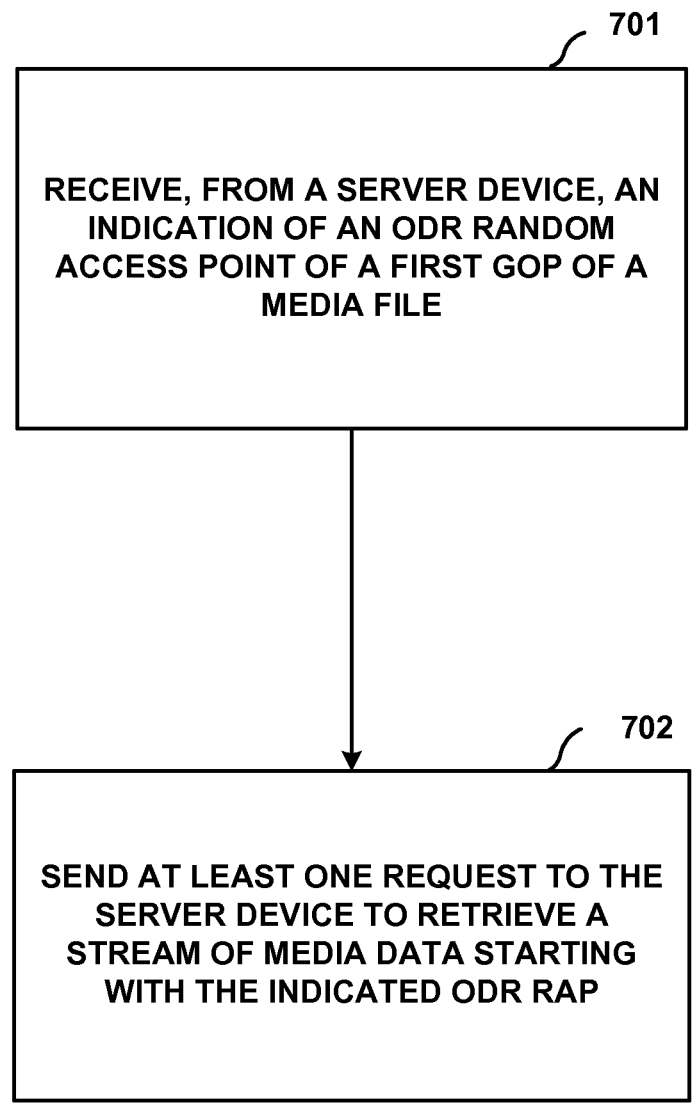
FIG. 7 is a flow chart that illustrates one example of a method of operating a client device to receive an indication of an open decoding refresh (ODR) random access point (RAP) consistent with the techniques of this disclosure.

FIG. 7 is a flow chart diagram that illustrates generally one example of a method of operating an HTTP client device consistent with the techniques of this disclosure. The method includes receiving, at a client device (e.g., A/V destination device 40 illustrated in FIG. 1) from a server device (e.g., A/V source device 20 illustrated in FIG. 1), an indication of an open decoding refresh random access point (e.g. frame 320I illustrated in FIG. 3) of a media segmentation (e.g., open GOP 310 illustrated in FIG. 3) (701). Encoding information for at least one frame indicates that at least one frame of the media segmentation following the ODR RAP frame in decoding order may not be correctly decoded, and that each frame of the media segmentation following the ODR RAP frame in display order can be correctly decoded without relying on content of frames prior to the ODR RAP in display order. The method further includes sending, by the client device, at least one request to the server device to retrieve a stream of media data starting with the indicated ODR RAP (702).

Figure 8:
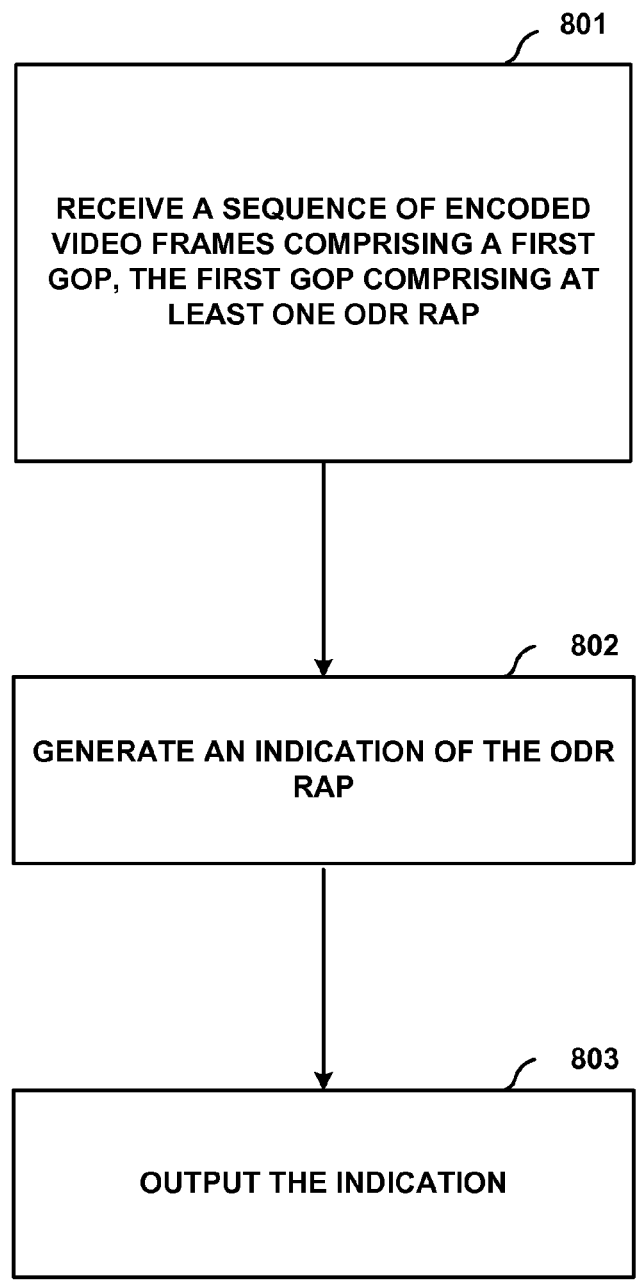
FIG. 8 is a flow chart that illustrates one example of a method of operating a source device to provide an indication of an ODR RAP consistent with the techniques of this disclosure.

FIG. 8 is a flow chart diagram that illustrates one example of a method of operating an HTTP server device consistent with the techniques of this disclosure. The method includes receiving a sequence of encoded video frames comprising an open decoding refresh (ODR) random access point (RAP) frame of a media segmentation (801). At least one frame of the media segmentation following the ODR RAP frame in decoding order may not be correctly decoded, and each frame of the media segmentation following the ODR RAP frame in display order can be correctly decoded without relying on content of frames prior to the ODR RAP in display order. The method further includes generating an indication of a location of the ODR RAP (802). The method further includes outputting the indication (803).

Figure 9:
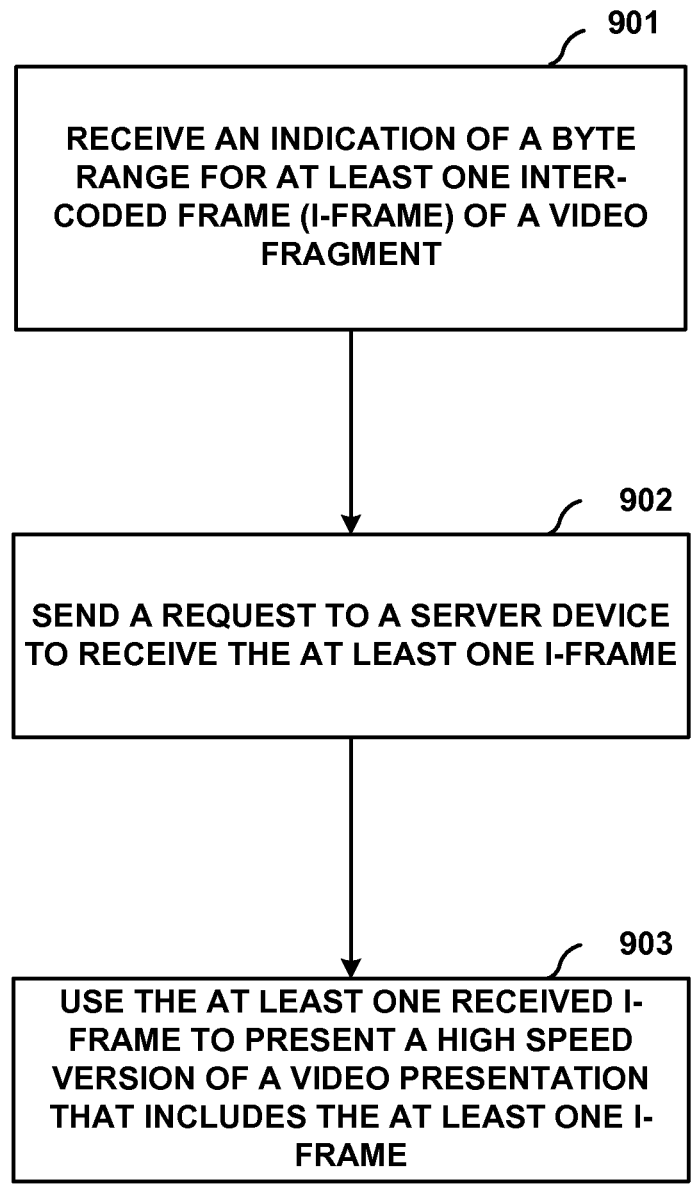
FIG. 9 is a flow chart that illustrates one example of a method of operating a client device to receive an indication of a byte range of an intra-coded frame (I-frame) consistent with the techniques of this disclosure.

FIG. 9 is a flow chart diagram that illustrates one example of a method of operating an HTTP client device to provide a high speed version of a video representation. The method includes receiving an indication of a byte range for at least one inter-coded frame (I-frame) of a video fragment (901). The method further includes sending a request to a server device to receive the at least one I-frame (902). The method further includes using the at least one received I-frame to present a high speed version of a video representation that includes the at least one I-frame (903).

Figure 10:
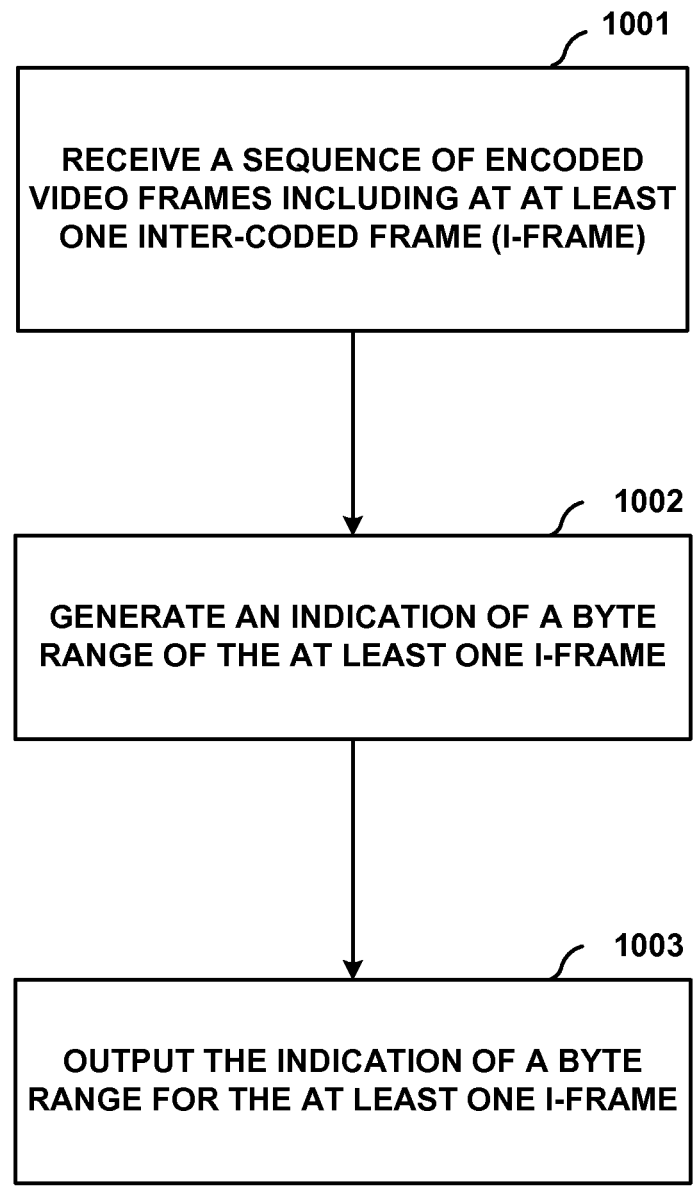
FIG. 10 is a flow chart diagram that illustrates one example of a method of operating a source device to provide an indication of a byte range of an intra-coded frame (I-frame) consistent with the techniques of this disclosure.

FIG. 10 is a flow chart diagram that illustrates one example of a method of operating an HTTP server device to provide an indication of a byte range of an inter-coded frame (I-frame). The method includes receiving a sequence of encoded video frames comprising at least one inter-coded frame (I-frame) (1001). The method further includes generating an indication of a byte range for the at least one I-frame (1002). The method further includes outputting the indication of a byte range for the at least one I-frame (1003). The method may further include receiving a request, e.g., an HTTP GET or partial GET request, to transmit the at least one I-frame based on the indication of the byte range. A client device may request the at least one I-frame, and use the at least one I-frame to provide a high speed version of a video presentation.

Figure 11:
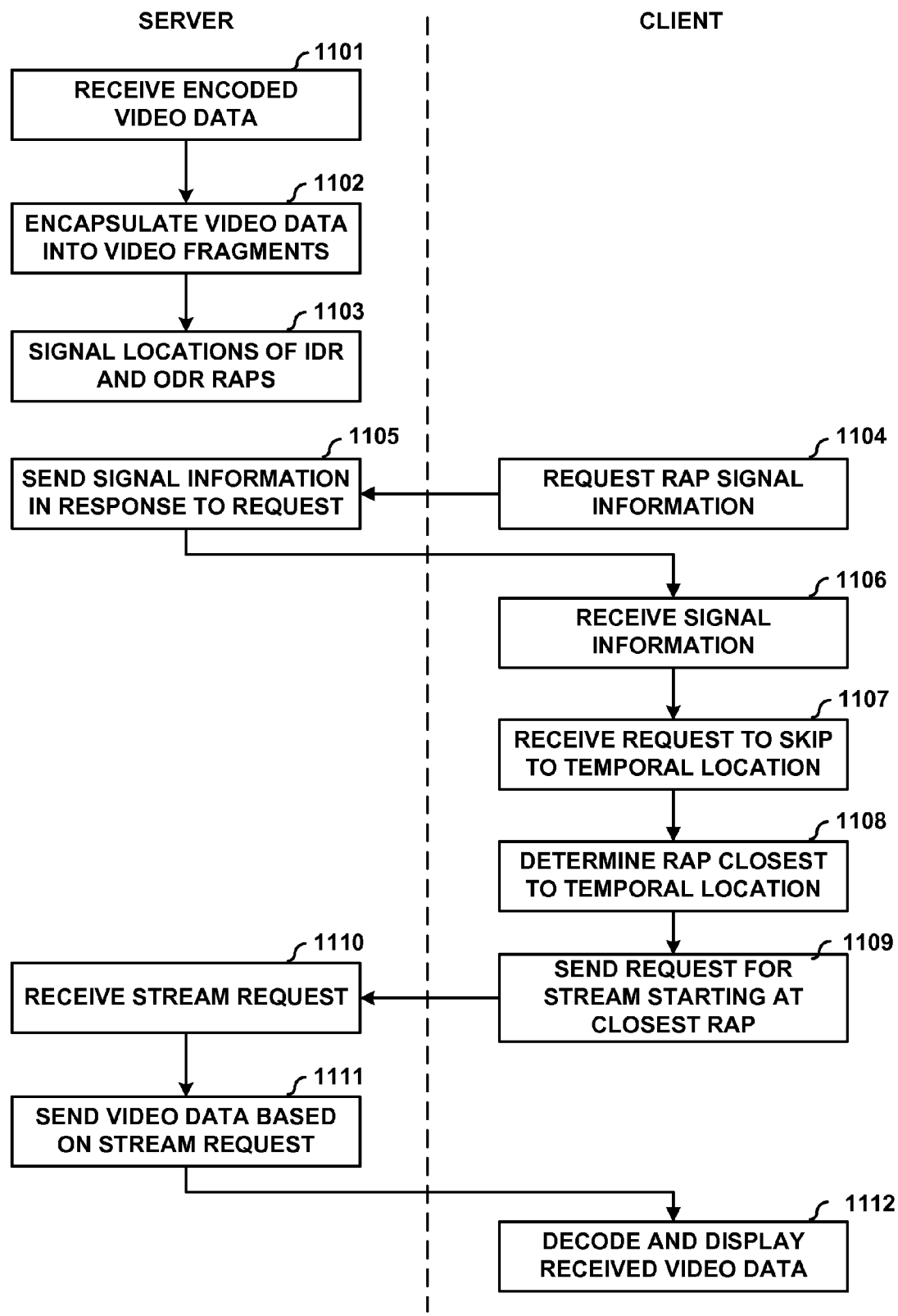
FIG. 11 is a flowchart that illustrates one example of steps that may be performed by respective HTTP client and server devices consistent with the techniques of this disclosure.

FIG. 11 is a flowchart that illustrates one example of steps that may be performed by respective HTTP client and server devices consistent with the techniques of this disclosure. The flow chart depicted in FIG. 11 is provided for exemplary purposes only as one example of steps that may be performed by respective client and server devices according to these techniques. The techniques of this disclose may also or instead utilize more or fewer steps than those depicted in FIG. 11, or may perform the depicted steps in other orders than those depicted and described.

In general, the method of FIG. 11 is described with respect to elements of FIG. 1. For example, steps indicated as being performed by the server may be performed by source device 20, while steps indicated as being performed by the client may be performed by destination device 40. However, it should be understood that these indications are provided only for purposes of example. In general, the method of FIG. 11 may be performed by any pair of server and client devices.

Initially, as shown in FIG. 11, encapsulation unit 30 of source device 20 may receive encoded video data (1101). Source device 20 may receive the encoded video data via a network connection, such as the Internet. Source device 20 may instead or in addition receive the encoded video data from one or more storage devices, internal or external to source device 20. The data may be previously encoded, or video encoder 28 may encode the data on the fly. As still another example, source device 20 may generate the data, e.g., in the context of computer generated video information, such as when executing a video game, and video encoder 28 may encode the generated video data. Encapsulation unit 30 may then encapsulate the received video data into video fragments (1102).

In addition, encapsulation unit 30 may signal one or more locations of one or more IDR and ODR RAPS of the video fragments (1103). For example, encapsulation unit 30 may signal an offset between the first frame of a media segmentation (e.g., a video fragment) including an ODR RAP, and the frame corresponding to the ODR RAP. When the first frame of the media segmentation is the ODR RAP, encapsulation unit 30 may set a flag or provide other information indicative of the first frame being an ODR RAP. Encapsulation unit 30 may further signal a number of samples (e.g., a number of frames) having presentation times prior to the ODR RAP. Likewise, encapsulation unit 30 may signal whether the media segmentation includes both an IDR and an ODR. As still another example, encapsulation unit 30 may signal a byte offset corresponding to the ODR RAP.

Destination device 40 may subsequently request the random access point signaling information, e.g., by submitting a request for header information of a representation including the media segmentation (1104). For example, the request may be a request for a media presentation description (MPD) file as described above. In another example, the request may be a request for a segment index box (SIDX) of one or more segmentation files. In response to the request, source device 20 sends the signaled locations of IDR and ODR RAPS, as created in step 1103 (1105).

Destination device 40 then receives the signal information (1106). Afterwards, in this example, destination device 40 may receive a request to skip to a temporal location within the video representation (1107). For example, the destination device may receive an indication from a user to jump to a particular temporal (in time) location for video playback. In another example, the destination device may itself initiate a skip to a temporal location, e.g., where the destination device has detected a change in bandwidth for streaming or other condition change, and initiate a request to receive an alternate representation of a video program in response to the detected change in bandwidth or other condition change.

In response to the request to skip to a temporal location, destination device 40 may determine a random access point that is closest to the temporal location (1108). That is, destination device 40 may use the RAP signal information to identify a RAP that is closest to the requested temporal location. After selecting this RAP, destination device 40 may generate a request to begin a stream of data starting at the determined RAP. For example, destination device 40 may generate an HTTP GET request to retrieve the entire fragment including the RAP, e.g., when the RAP is the first frame of the fragment. As another example, destination device 40 may use the signaled information to determine a starting byte location of the RAP within a media segmentation. Suppose, for example, that the media segmentation is N bytes long, and that data for the RAP begins at byte X, where 0<X<N. Destination device 40 may generate an HTTP partial GET request for the media segmentation specifying a byte range of (X, N), in order to retrieve data corresponding to the RAP through the end of the file.

Moreover, various destination devices may be configured to use the signaled information differently. For example, some destination devices may be sophisticated enough to select between IDR and ODR RAPs. On the other hand, some destination devices may only be configured to support generation of requests for IDR RAPs. By signaling both IDR and ODR RAPs, the techniques of this disclosure provide more sophisticated devices with the ability to implement finer granularity of selection of a starting point of a stream, without isolating or excluding legacy devices or devices otherwise not equipped to utilize ODR RAPs.

After generating the request, destination device 40 may send the request to source device 20 (1109). After receiving the request (1110), source device 20 may respond by sending video data based on the request in the form of a stream to destination device 40 (1111). Although illustrated sequentially for ease of illustration and understanding, it should be understood that destination device 40 may generate multiple HTTP GET and/or partial GET requests to receive the entire stream of video data. In any case, after receiving the video data, decapsulation unit 38 may decapsulate the video data, video decoder 48 may decode the data, and video output 44 may display the video data (1112).

Figure 12:
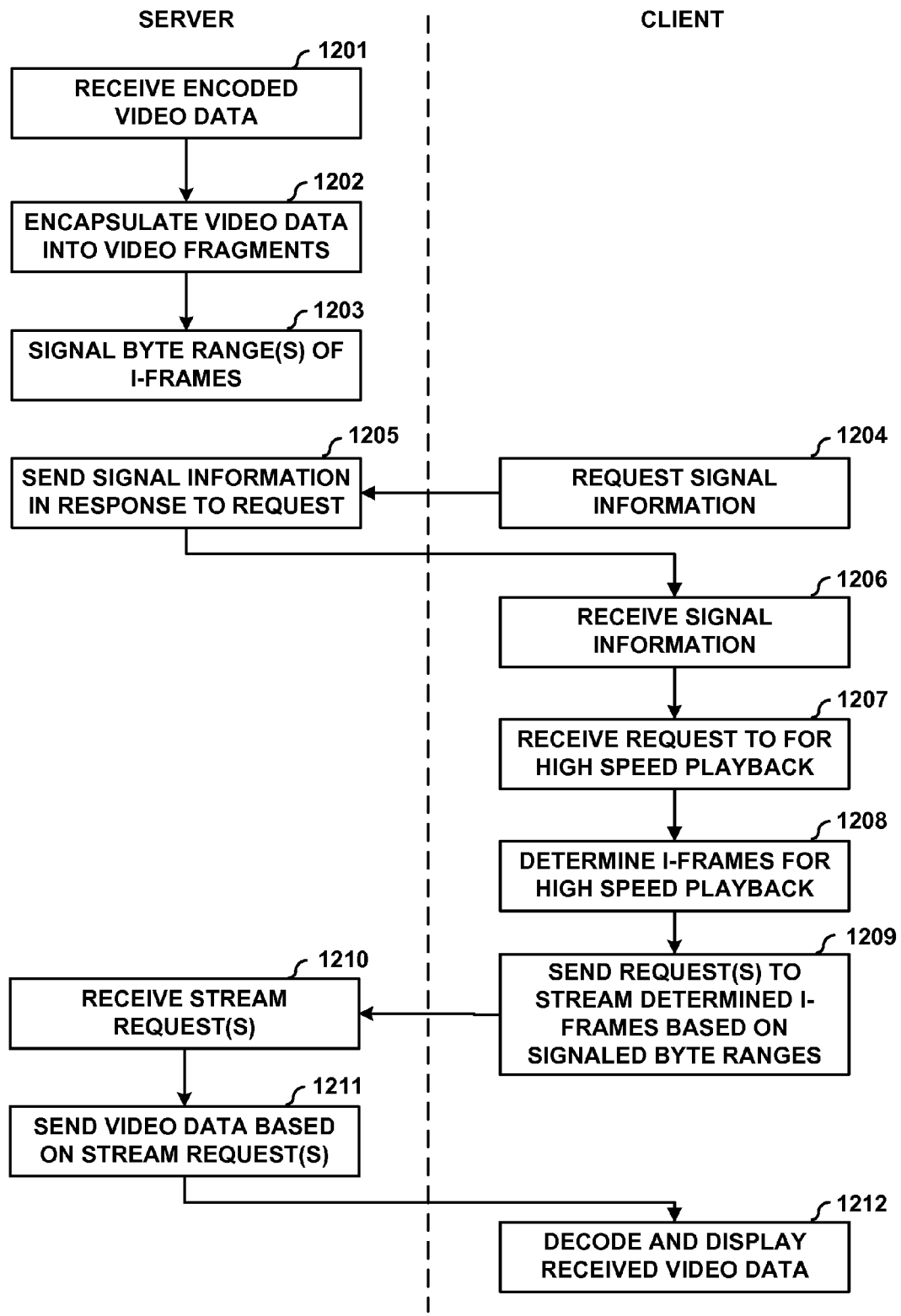
FIG. 12 is a flow chart diagram that illustrates one example of steps that may be performed by respective HTTP client and server devices consistent with the techniques of this disclosure.

FIG. 12 is a flow chart diagram that illustrates one example of steps that may be performed by respective HTTP client and server devices consistent with the techniques of this disclosure. The flow chart depicted in FIG. 12 is provided for exemplary purposes only as one example of steps that may be performed by respective client and server devices according to these techniques. The techniques of this disclose may also or instead utilize more or fewer steps than those depicted in FIG. 12, or may perform the depicted steps in other orders than those depicted and described.

In general, the method of FIG. 12 is described with respect to elements of FIG. 1. For example, steps indicated as being performed by the server may be performed by source device 20, while steps indicated as being performed by the client may be performed by destination device 40. However, it should be understood that these indications are provided only for purposes of example. In general, the method of FIG. 12 may be performed by any pair of server and client devices.

Initially, as shown in FIG. 12, encapsulation unit 30 of source device 20 may receive encoded video data (1201). Source device 20 may receive the encoded video data using a network connection such as the internet. Source device 20 may instead or in addition receive the encoded video data from one or more storage devices, internal or external to the server device. The data may be previously encoded, or video encoder 28 may encode the data on the fly. As still another example, source device 20 may generate the data, e.g., in the context of computer generated video information, such as when executing a video game, and video encoder 28 may encode the generated video data. Encapsulation unit 30 may then encapsulate the received video data into video fragments (1202).

In addition, encapsulation unit 30 may signal at least one byte range within the encoded video data that includes at least one intra-coded frame (I-frame) (1203). For example, encapsulation unit 30 may signal a byte range for one or more I-frames themselves (e.g., a byte range of the I-frame). In one such example, encapsulation unit 30 may signal a start point for an I-frame by signaling a byte offset from a first byte of the encoded video presentation. According to this example, encapsulation unit 30 may further signal an end point for an I-frame by signaling a byte offset from a first byte of the encoded video presentation, or by signaling a byte offset from the start point of the I-frame. In another example, encapsulation unit 30 may signal a byte range of the encoded video data that includes the at least one I-frame, as well as other inter-coded frames (e.g., B and P frames).

Destination device 40 may send a request to source device 20 for I-frame signal information (1204). The request for I-frame signal information may include a request for some or all header information for one or more segmentation files. For example, the request may be a request for a media presentation description (MPD) file as described above. In another example, the request may be a request for a segment index box (SIDX) of one or more segmentation files. In response to the request, source device 20 may send the signaled one or more byte ranges that include at least one I-frame from step 1203 (1205). Destination device 40 may receive the I-frame signal information (1206). Destination device 40 may receive (e.g., from a user, or from one or more software programs) a request to play back a high speed version of a video presentation (e.g., a fast forward, rewind, or fast rewind version of the video presentation) (1207). In one example, the request may include an indication from a user to modify playback of a video representation to present a high speed version of the video presentation.

The destination device may determine I-frames for high speed playback (1208). For example, if source device 20 signaling the at least one byte range at step 1203 by signaling a byte range for one or more I-frames themselves (e.g., a byte range of the I-frame), destination device 40 may determine one or more I-frames for high speed playback by determining which of a plurality of I-frames for which a byte range is signaled are to be used (e.g., transmitted, decoded) for high speed playback. In another example, if source device signaled a byte range that includes at least one I-frame, as well as other inter-coded frames (e.g., B and P frames), destination device may determine from the one or more signaled byte ranges I-frames that may be used for high speed playback. The destination device 40 may send to a source device 20 a request to stream media data including the one or more I-frames determined at step 1208 (1209). The request may be a partial GET request that identifies a segmentation file (e.g., movie fragment, segment, and/or representation) and a desired byte range of the segmentation file to be streamed in response to the request.

The source device 20 may receive the request to stream media data (1210). In response to the request, the source device 20 may stream media data based on the stream request (1211). The destination device 40 may decode the received video data in response to the request, and display the received video data (1212) as a high speed (e.g., fast forward, rewind, fast rewind) version of the video representation. In some examples, the source device may decode only media data determined at step 1208 for use to provide a high speed version of a video representation. In one example, the destination device 40 may present the high speed version of the video representation by consecutively presenting two or more I-frames of retrieved media data that are temporally separated by at least one inter-coded frame in the encoded media data received by the server at step 1201.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, at a client device from a server device, an indication of a maximum byte offset defining a byte range within a plurality of media segments, wherein the maximum byte offset is less than the total number of bytes in each of the plurality of media segments, wherein the indication of the maximum byte offset further indicates that each of the media segments includes at least one intra-coded frame (I-frame) within the byte range, wherein each of the plurality of media segments comprises a respective file associated with a respective one of a plurality of uniform resource locators (URLs), and wherein the plurality of media segments represent a video presentation configured to be displayed at a first playback speed;
   in response to a determination to present the video representation using a trick mode, sending, by the client device, requests to the server device to retrieve media data from each of the plurality of media segments corresponding to the byte range based on the indication, wherein the requests specify the URL associated with a respective one of the media segments and specify the byte range, such that each of the requests specifies a different one of the URLs but specifies the same byte range; and
   using the retrieved media data within the byte range to present a high speed version of the video representation, in accordance with the trick mode, that includes the at least one I-frame at a second playback speed higher than the first playback speed, wherein the retrieved media data for a first media segment of the plurality of media segments includes data for a non-I-frame following an I-frame of the first media segment and the retrieved media data for a second media segment of the plurality of media segments ends with an I-frame of the second media segment.

2. The method of claim 1, wherein using the retrieved media data within the byte range to present a high speed version of a video presentation that includes the at least one I-frame comprises:
   consecutively presenting two or more I-frames of the retrieved media data, wherein the two or more I-frames are temporally separated by at least one inter-coded frame.

3. The method of claim 1, wherein using the retrieved media data within the byte range to present a high speed version of a video presentation that includes the at least one I-frame comprises presenting a fast forward or fast rewind version of the video presentation.

4. The method of claim 1, wherein the requests are hypertext transfer protocol (HTTP) Get requests that include an indication of the byte range to retrieve the stream indicated by the byte range within the at least one media segment.

5. A device, comprising:
   means for receiving, at a client device from a server device, an indication of a maximum byte offset defining a byte range within a plurality of media segments, wherein the maximum byte offset is less than the total number of bytes in each of the plurality of media segments, wherein the indication of the maximum byte offset further indicates that each of the media segments includes at least one intra-coded frame (I-frame) within the byte range, wherein each of the plurality of media segments comprises a respective file associated with a respective one of a plurality of uniform resource locators (URLs), and wherein the plurality of media segments represent a video presentation configured to be displayed at a first playback speed;
   means for sending, by the client device, in response to a determination to present the video representation using a trick mode, requests to the server device to retrieve media data from each of the plurality of media segments corresponding to the byte range based on the indication, wherein the requests specify the URL associated with a respective one of the media segments and specify the byte range, such that each of the requests specifies a different one of the URLs but specifies the same byte range; and
   means for using the retrieved media data within the byte range to present a high speed version of the video representation that includes the at least one I-frame at a second playback speed higher than the first playback speed, wherein the retrieved media data for a first media segment of the plurality of media segments includes data for a non-I-frame following an I-frame of the first media segment and the retrieved media data for a second media segment of the plurality of media segments ends with an I-frame of the second media segment.

6. The device of claim 5, wherein the means for using the retrieved media data within the byte range to present a high speed version of a video presentation consecutively present two or more I-frames of the retrieved media data, wherein the two or more I-frames are temporally separated by at least one inter-coded frame.

7. The device of claim 5, wherein the means for using the retrieved media data within the byte range to present a high speed version of a video presentation present a fast forward or fast rewind version of the video presentation.

8. The device of claim 5, wherein the requests are hypertext transfer protocol (HTTP) Get requests that include an indication of the byte range to retrieve the stream indicated by the byte range within the at least one media segment.

9. A non-transitory computer readable storage medium that stores instructions configured to cause a computing device to:
   receive, at a client device from a server device, an indication of a maximum byte offset defining a byte range within a plurality of media segments, wherein the maximum byte offset is less than the total number of bytes in each of the plurality of media segments, wherein the indication of the maximum byte offset further indicates that each of the media segments includes at least one intra-coded frame (I-frame) within the byte range, wherein each of the plurality of media segments comprises a respective file associated with a respective one of a plurality of uniform resource locators (URLs), and wherein the plurality of media segments represent a video presentation configured to be displayed at a first playback speed;

in response to a determination to present the video representation using a trick mode, send, by the client device, requests to the server device to retrieve media data from each of the plurality of media segments corresponding to the byte range based on the indication, wherein the requests specify the URL associated with a respective one of the media segments and specify the byte range, such that each of the requests specifies a different one of the URLs but specifies the same byte range; and use the retrieved media data within the byte range to present a high speed version of the video representation that includes the at least one I-frame at a second playback speed higher than the first playback speed, wherein the retrieved media data for a first media segment of the plurality of media segments includes data for a non-I-frame following an I-frame of the first media segment and the retrieved media data for a second media segment of the plurality of media segments ends with an I-frame of the second media segment.

10. The computer readable storage medium of claim 9, wherein the instructions cause the computing device to:
present a high speed version of a video presentation that includes the at least one I-frame by consecutively presenting two or more I-frames of the retrieved media data, wherein the two or more I-frames are temporally separated by at least one inter-coded frame.

11. The computer readable storage medium of claim 9, wherein the instructions cause the computing device to:
use the retrieved media data within the byte range to present a fast forward or fast rewind version of the video presentation.

12. The computer readable storage medium of claim 9, wherein the requests are hypertext transfer protocol (HTTP) Get requests that include an indication of the byte range to retrieve the stream indicated by the byte range within the at least one media segment.

13. A device, comprising:
a memory configured to store a plurality of media segments; and
at least one processor configured to:
receive an indication of a maximum byte offset defining a byte range within the plurality of media segments, wherein the maximum byte offset is less than the total number of bytes in each of the plurality of media segments, wherein the indication of the maximum byte offset further indicates that each of the media segments includes at least one intra-coded frame (I-frame) within the byte range, wherein each of the plurality of media segments comprises a respective file associated with a respective one of a plurality of uniform resource locators (URLs), and wherein the plurality of media segments represent a video presentation configured to be displayed at a first playback speed;
in response to a determination to present the video representation using a trick mode, send requests to the server device to retrieve media data from each of the plurality of media segments corresponding to the byte range based on the indication, wherein the requests specify the URL associated with a respective one of the media segments and specify the byte range, such that each of the requests specifies a different one of the URLs but specifies the same byte range; and
use the retrieved media data within the byte range to present a high speed version of the video representation that includes the at least one I-frame at a second playback speed higher than the first playback speed, wherein the retrieved media data for a first media segment of the plurality of media segments includes data for a non-I-frame following an I-frame of the first media segment and the retrieved media data for a second media segment of the plurality of media segments ends with an I-frame of the second media segment.

14. The device of claim 13, wherein the at least one processor is configured to use the at least one received I-frame to present a high speed version of a video presentation that includes the at least one I-frame by consecutively presenting two or more I-frames of the retrieved media data, wherein the two or more I-frames are temporally separated by at least one inter-coded frame.

15. The device of claim 13, wherein the processor is configured to use the at least one received I-frame to present fast forward or rewind version of the video representation.

16. The device of claim 13, wherein the indication of the at least one byte range comprises an indication of a byte range from a first byte of the media segment to a last byte of a first I-frame of the media segment.

17. The device of claim 13, wherein the requests are hypertext transfer protocol (HTTP) Get requests that include an indication of the byte range to retrieve the stream indicated by the byte range within the at least one media segment.

18. A method comprising:
receiving a plurality of media segments, each of the plurality of media segments comprising a respective sequence of encoded video frames comprising at least one intra-coded frame (I-frame), and wherein each of the plurality of media segments comprises a respective file;
determining a maximum of byte offsets to last bytes of the intra-coded frames of the plurality of media segments to determine a maximum byte offset for the plurality of media segments;
generating an indication of the maximum byte offset defining a byte range within the plurality of media segments, wherein the indication of the maximum byte offset further indicates that each of the media segments includes at least one I-frame within the byte range, wherein the maximum byte offset is less than the total number of bytes in each of the plurality of media segments, and wherein a first media segment of the plurality of media segments includes data for a non-I-frame following an I-frame of the first media segment within the byte range and a second media segment of the plurality of media segments ends with an I-frame of the second media segment at the byte range; and
outputting the indication of the maximum byte offset.

19. The method of claim 18, wherein each of the plurality of media segments is associated with a respective one of a plurality of uniform resource locator (URLs), the method further comprising:

receiving requests to retrieve portions of the plurality of media segments corresponding to the byte range, wherein each of the requests specifies a different one of the URLs but specifies the same byte range; and outputting, in response to the request, the portions of the plurality of media segments corresponding to the byte range.

20. The method of claim 19, wherein the requests comprise respective hypertext transfer protocol (HTTP) GET requests that include an indication of the byte range to retrieve data of the respective plurality of media segments.

21. The method of claim 18, wherein the indication of the maximum offset corresponds to a last byte of a byte range within the plurality of media segments, wherein in the request for the first media segment, the byte range comprises a byte range from a first byte of the one of the plurality of media segments to a last byte of a first I-frame of the first media segment.

22. A device comprising:
means for receiving a plurality of media segments, each of the plurality of media segments comprising a respective sequence of encoded video frames comprising at least one intra-coded frame (I-frame), and wherein each of the plurality of media segments comprises a respective file;
means for determining a maximum of byte offsets to last bytes of the intra-coded frames of the plurality of media segments to determine a maximum byte offset for the plurality of media segments;
means for generating an indication of the maximum byte offset defining a byte range within the plurality of media segments, wherein the indication of the maximum byte offset further indicates that each of the media segments includes at least one I-frame within the byte range, wherein the maximum byte offset is less than the total number of bytes in each of the plurality of media segments, and wherein a first media segment of the plurality of media segments includes data for a non-I-frame following an I-frame of the first media segment within the byte range and a second media segment of the plurality of media segments ends with an I-frame of the second media segment at the byte range; and
means for outputting the indication of the maximum byte offset.

23. The device of claim 22, wherein each of the plurality of media segments is associated with a respective one of a plurality of uniform resource locators (URLs), the device further comprising:
means for receiving requests to retrieve portions of the plurality of media segments corresponding to the byte range, wherein each of the requests specifies a different one of the URLs but specifies the same byte range; and
means for outputting, in response to the request, the portions of the plurality of media segments corresponding to the byte range.

24. The device of claim 23, wherein the requests comprise respective hypertext transfer protocol (HTTP) GET requests that include an indication of the byte range to retrieve data of the respective plurality of media segments.

25. The device of claim 22, wherein the indication of the maximum offset corresponds to a last byte of a byte range within the plurality of media segments, wherein in the request for the first media segment, the byte range comprises a byte range from a first byte of the one of the plurality of media segments to a last byte of a first I-frame of the first media segment.

26. A non-transitory computer readable storage medium that stores instructions configured to cause a computing device to:
receive a plurality of media segments, each of the plurality of media segments comprising a respective sequence of encoded video frames comprising at least one intra-coded frame (I-frame), and wherein each of the plurality of media segments comprises a respective file;
determine a maximum of byte offsets to last bytes of the intra-coded frames of the plurality of media segments to determine a maximum byte offset for the plurality of media segments;
generate an indication of the maximum byte offset defining a byte range within the plurality of media segments, wherein the indication of the maximum byte offset further indicates that each of the media segments includes at least one I-frame within the byte range, wherein the maximum byte offset is less than the total number of bytes in each of the plurality of media segments, and wherein a first media segment of the plurality of media segments includes data for a non-I-frame following an I-frame of the first media segment within the byte range and a second media segment of the plurality of media segments ends with an I-frame of the second media segment at the byte range; and
output the indication of the maximum byte offset.

27. The computer readable storage medium of claim 26, wherein the indication of the maximum offset corresponds to a last byte of a byte range within the plurality of media segments, wherein in the request for the first media segment, the byte range comprises a byte range from a first byte of the one of the plurality of media segments to a last byte of a first I-frame of the first media segment.

28. A device comprising:
a memory configured to store a plurality of media segments; and
one or more processors configured to:
receive the plurality of media segments, each of the plurality of media segments comprising a respective sequence of encoded video frames comprising at least one intra-coded frame (I-frame), and wherein each of the plurality of media segments comprises a respective file;
determine a maximum of byte offsets to last bytes of the intra-coded frames of the plurality of media segments to determine a maximum byte offset for the plurality of media segments;
generate an indication of the maximum byte offset defining a byte range within the plurality of media segments, wherein the indication of the maximum byte offset further indicates that each of the media segments includes at least one I-frame within the byte range, wherein the maximum byte offset is less than the total number of bytes in each of the plurality of media segments, and wherein a first media segment of the plurality of media segments includes data for a non-I-frame following an I-frame of the first media segment within the byte range and a second media segment of the plurality of media segments ends with an I-frame of the second media segment at the byte range; and
output the indication of the maximum byte offset.

29. The device of claim 28, wherein the indication of the maximum offset corresponds to a last byte of a byte range within the plurality of media segments, wherein in the request for the first media segment, the byte range comprises a byte range from a first byte of the one of the plurality of media segments to a last byte of a first I-frame of the first media segment.

30. The method of claim 1, wherein the requests comprise partial GET requests specifying a byte range defined by a first byte of the respective one of the plurality of media segments and the maximum byte offset.

31. The device of claim 5, wherein the requests comprise partial GET requests specifying the byte range defined by a first byte of the respective one of the plurality of media segments and the maximum byte offset.

32. The computer readable storage medium of claim 9, wherein the requests comprise partial GET requests specifying a byte range defined by a first byte of the respective one of the plurality of media segments and the maximum byte offset.

33. The method of claim 18, further comprising:
receiving requests specifying the byte range defined by the maximum byte offset for each of the plurality of media segments; and
in response to the requests, outputting media data of the byte range defined by the maximum byte offset from the respective ones of the plurality of media segments.

34. The device of claim 22, further comprising:
means for receiving requests specifying the byte range defined by the maximum byte offset for each of the plurality of media segments; and
means for outputting, in response to the requests, media data of the byte range defined by the maximum byte offset from the respective ones of the plurality of media segments.

35. The computer readable storage medium of claim 26, further comprising instructions that cause the computing device to:
receive requests specifying the byte range defined by the maximum byte offset for each of the plurality of media segments; and
in response to the requests, output media data of the byte range defined by the maximum byte offset from the respective ones of the plurality of media segments.

36. The device of claim 28, wherein the one or more processors are configured to receive requests specifying the byte range defined by the maximum byte offset for each of the plurality of media segments, and, in response to the requests, output media data of the byte range defined by the maximum byte offset from the respective ones of the plurality of media segments.

37. The computer-readable storage medium of claim 26, further comprising instructions that cause the processor to:
receive requests to retrieve portions of the plurality of media segments corresponding to the byte range, wherein each of the requests specifies a different one of the URLs but specifies the same byte range; and
output, in response to the request, the portions of the plurality of media segments corresponding to the byte range.

38. The device of claim 28, wherein the one or more processors are further configured to:
receive requests to retrieve portions of the plurality of media segments corresponding to the byte range, wherein each of the requests specifies a different one of the URLs but specifies the same byte range; and
output, in response to the request, the portions of the plurality of media segments corresponding to the byte range.

* * * * *